(12) United States Patent
Cai et al.

(10) Patent No.: US 12,712,585 B2
(45) Date of Patent: Aug. 18, 2026

(54) TERMINAL ANTENNA CONTROL METHOD AND APPARATUS

(71) Applicant: HONOR DEVICE CO., LTD., Shenzhen (CN)

(72) Inventors: Xiaotao Cai, Shenzhen (CN); Liang Liu, Shenzhen (CN); Dawei Zhou, Shenzhen (CN); Chunhui Ye, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 324 days.

(21) Appl. No.: 18/558,088

(22) PCT Filed: May 15, 2023

(86) PCT No.: PCT/CN2023/094264
§ 371 (c)(1),
(2) Date: Oct. 30, 2023

(87) PCT Pub. No.: WO2024/041044
PCT Pub. Date: Feb. 29, 2024

(65) Prior Publication Data

US 2024/0204816 A1 Jun. 20, 2024

(30) Foreign Application Priority Data

Aug. 23, 2022 (CN) ......................... 202211009495.5

(51) Int. Cl.
*H04B 1/3827* (2015.01)
*G01R 27/32* (2006.01)
(Continued)

(52) U.S. Cl.
CPC ............ *H04B 1/3838* (2013.01); *H04B 1/40* (2013.01)

(58) Field of Classification Search
None
See application file for complete search history.

(56) References Cited

U.S. PATENT DOCUMENTS 7,511,513 B2 * 3/2009 Nevermann ............. G01D 5/48 455/117
8,326,385 B2 * 12/2012 Brogle ................ G01D 5/2405 455/90.3
(Continued)

FOREIGN PATENT DOCUMENTS

CN 102098243 A 6/2011
CN 103609026 A 2/2014
(Continued)

OTHER PUBLICATIONS

Harel et al., Controlling MTD Antenna VSWR And Coupling For SAR Control, Feb. 14, 2018, European Patent, English translation, Whole document.*

*Primary Examiner* — Tuan A Tran
(74) *Attorney, Agent, or Firm* — WOMBLE BOND DICKINSON (US) LLP

(57) ABSTRACT

This application provides a terminal antenna control method and apparatus. The method includes: obtaining a real-time reflection coefficient of an antenna of a terminal device; determining, based on a distance difference between locations that are of the real-time reflection coefficient and a free space FS reflection coefficient of the antenna and that are on a Smith chart, whether the antenna is in a human body use scenario; if the antenna is in the human body use scenario, determining whether a specific absorption rate SAR of the antenna is greater than or equal to a first preset threshold; and if the SAR is greater than or equal to the first preset threshold, adjusting an adjustable device of the antenna to
(Continued)

increase a reflection coefficient of a transmit frequency band of the antenna, where the adjustable device includes a capacitor and/or an inductor.

20 Claims, 15 Drawing Sheets

(51) Int. Cl.
*H04B 1/40* (2015.01)
*H04B 17/00* (2015.01)

(56) References Cited

U.S. PATENT DOCUMENTS 8,886,247 B1 * 11/2014 Price .................... H04B 1/3838 455/575.4
9,026,059 B2 * 5/2015 Shi ........................ H04W 52/18 455/67.11
9,191,055 B2 * 11/2015 Lehmann ............. H04B 1/3838
9,307,499 B2 * 4/2016 Zehr ..................... H04W 52/18
9,500,727 B2 * 11/2016 Sohn ................ G01R 33/34092
9,525,203 B2 12/2016 Harel et al.
9,640,863 B2 5/2017 Shen
9,647,740 B1 5/2017 Black et al.
10,893,488 B2 1/2021 Khawand et al.
11,056,772 B2 7/2021 Dong et al.
11,924,819 B2 * 3/2024 Cai ....................... H04W 72/56
2003/0062907 A1 4/2003 Nevermann
2003/0064761 A1 4/2003 Nevermann
2005/0124305 A1 6/2005 Stichelbout
2015/0201385 A1 * 7/2015 Mercer ............... H04W 52/367 455/67.11
2020/0044612 A1 * 2/2020 Bologna .............. H04B 1/3838
2020/0169276 A1 5/2020 Kim et al.

FOREIGN PATENT DOCUMENTS

CN 108777744 A 11/2018
CN 108832281 A 11/2018
CN 108963451 A 12/2018
CN 109120786 A 1/2019
CN 112534725 A 3/2021
CN 113242594 A 8/2021
CN 114040489 A 2/2022
CN 115085755 A 9/2022
EP 3008827 B1 7/2020
WO 2012020475 A1 2/2012
WO 2022042772 A1 3/2022

* cited by examiner

TERMINAL ANTENNA CONTROL METHOD AND APPARATUS

CROSS-REFERENCE TO RELATED APPLICATIONS

This application is a national stage of International Application No. PCT/CN2023/094264, filed on May 15, 2023, which claims priority to Chinese Patent Application No. 202211009495.5, filed on Aug. 23, 2022. The disclosures of both of the aforementioned applications are hereby incorporated by reference in their entireties.

TECHNICAL FIELD

This application relates to the field of terminal technologies, and in particular, to a terminal antenna control method and apparatus.

BACKGROUND

With continuous development and widespread use of a terminal device, more attention is paid to impact of electromagnetic radiation generated by the terminal device on a human body. Currently, a specific absorption rate (specific absorption rate, SAR) is usually used to measure the impact of the electromagnetic radiation generated by the terminal device on the human body. A lower SAR value represents smaller impact of the electromagnetic radiation generated by the terminal device on the human body. Therefore, an SAR test is usually performed on a terminal device, and only a terminal device whose SAR value meets a limitation of an SAR regulation can enter the market for selling.

To make electromagnetic radiation generated by a terminal device meet the limitation of the SAR regulation, currently, a method needs to be provided urgently to decrease an SAR value of the terminal device.

SUMMARY

This application provides a terminal antenna control method and apparatus. When a radio frequency conduction power is not changed, it is identified that a human body approaches; and when an SAR needs to be reduced, the conduction power is no longer reduced, and a reflection coefficient of a port of an antenna is increased by adjusting a status of the antenna, thereby decreasing an SAR value.

According to a first aspect, a terminal antenna control method is provided. The method includes: obtaining a real-time reflection coefficient of an antenna of a terminal device; determining, based on the real-time reflection coefficient, whether the antenna is in a human body use scenario; if the antenna is in the human body use scenario, determining whether a specific absorption rate SAR of the antenna is greater than or equal to a first preset threshold; and if the SAR is greater than or equal to the first preset threshold, adjusting an adjustable device of the antenna to increase a reflection coefficient of a transmit frequency band of the antenna, where the adjustable device includes a capacitor and/or an inductor.

In the terminal antenna control method provided in this application, a value of the capacitor and/or the inductor in the antenna is adjusted to increase the reflection coefficient of the transmit frequency band of the antenna, thereby reducing the SAR of the antenna. By using this method, the SAR of the antenna can be reduced without reducing a conduction power of the antenna.

It should be understood that the reflection coefficient of the antenna is a value between 0~1. The real-time reflection coefficient is an instantaneous reflection coefficient of the antenna. For example, when a human body approaches the antenna, the real-time reflection coefficient is a reflection coefficient of the antenna that is detected by the terminal device after the human body approaches the antenna.

In some implementations of the first aspect, the determining, based on the real-time reflection coefficient, whether the antenna is in a human body use scenario includes: calculating a distance difference between locations that are of the real-time reflection coefficient and a free space FS reflection coefficient of the antenna and that are on a Smith chart; and determining, based on the distance difference, whether the antenna is in the human body use scenario.

It should be understood that the FS reflection coefficient of the antenna is usually in an impedance matching state, and the antenna in an FS state has a small reflection coefficient. As the human body approaches the antenna, the human body affects near field distribution of the antenna, and a reflection coefficient of a port of the antenna changes. In this case, a distance difference between locations that are of a reflection coefficient in a human body approaching state and a reflection coefficient in the FS state and that are on the Smith chart is generated.

In some implementations of the first aspect, the calculating a distance difference between locations that are of the real-time reflection coefficient and a free space FS reflection coefficient of the antenna and that are on a Smith chart includes: determining a first coordinate point of the real-time reflection coefficient on the Smith chart; determining a second coordinate point of the FS reflection coefficient of the antenna on the Smith chart; and calculating a distance between the first coordinate point and the second coordinate point, and determining the distance as the distance difference.

It should be understood that the Smith chart is a calculation chart that is plotted with a normalized input impedance (or admittance) equivalent circle family on a reflection coefficient plane, and the reflection coefficient of the antenna can be represented on the Smith chart. In the Smith chart, a reflection coefficient of a coordinate point closer to a center of a circle is closer to 0, and a reflection coefficient of a coordinate point farther from the center of the circle is closer to 1.

In some implementations of the first aspect, the determining, based on the distance difference, whether the antenna is in the human body use scenario includes: when the distance difference is greater than or equal to a second preset threshold, determining that the antenna is in the human body use scenario.

It should be understood that the second preset threshold is a value of the distance between the first coordinate point and the second coordinate point.

In some implementations of the first aspect, the terminal antenna control method further includes: if the antenna is not in the human body use scenario, determining that the antenna is in an FS state, and maintaining a current state of the antenna.

It should be understood that if the antenna is not in the human body use state, it indicates that there is a large distance between the human body and the antenna. This does not affect transmission performance of the antenna, that is, the antenna is in the FS state. In this case, it is already determined that electromagnetic radiation generated by the terminal device does not affect the human body, and only the current state of the antenna needs to be maintained.

In some implementations of the first aspect, the terminal antenna control method further includes: if the SAR is less than the first preset threshold, maintaining a current state of the antenna.

It should be understood that, if the detected SAR of the antenna is less than the first preset threshold, it indicates that the SAR of the antenna meets a requirement of an SAR regulation. In this case, the current state of the antenna does not need to be adjusted.

According to a second aspect, a terminal antenna control apparatus is provided, configured to perform the method according to any possible implementation in the first aspect. Specifically, the apparatus includes a module configured to perform the method according to any possible implementation in the first aspect.

According to a third aspect, this application provides still another terminal antenna control apparatus, including a processor, where the processor is coupled to a memory, and may be configured to perform instructions in the memory, to implement the method according to any possible implementation in the first aspect. Optionally, the apparatus further includes a memory. Optionally, the apparatus further includes a communication interface, and the processor is coupled to the communication interface.

In an implementation, the apparatus is a terminal device. When the apparatus is a terminal device, the communication interface may be a transceiver or an input/output interface.

In another implementation, the apparatus is a chip disposed in a terminal device. When the apparatus is a chip disposed in a terminal device, the communication interface may be an input/output interface.

According to a fourth aspect, a processor is provided, including an input circuit, an output circuit, and a processing circuit. The processing circuit is configured to receive a signal by using the input circuit, and transmit a signal by using the output circuit, to enable the processor to perform the method according to any possible implementation in the first aspect.

In a specific implementation procedure, the processor may be a chip, the input circuit may be an input pin, the output circuit may be an output pin, and the processing circuit may be a transistor, a gate circuit, a flip-flop, various logic circuits, and the like. The input signal received by the input circuit may be received and input by, for example, but not limited to, a receiver. The signal output by the output circuit may be output to and transmitted by, for example, but not limited to, a transmitter. In addition, the input circuit and the output circuit may be a same circuit, and the circuit separately serves as the input circuit and the output circuit at different moments. Specific implementations of the processor and various circuits are not limited in this embodiment of this application.

According to a fifth aspect, a processing apparatus is provided, including a processor and a memory. The processor is configured to read instructions stored in the memory, and can receive a signal by using a receiver and transmit a signal by using a transmitter, to perform the method according to any possible implementation in the first aspect.

Optionally, there is one or more processors, and there is one or more memories.

Optionally, the memory and the processor may be integrated together, or the memory and the processor are separately disposed.

In a specific implementation procedure, the memory may be a non-transitory (non-transitory) memory, for example, a read-only memory (read-only memory, ROM). The memory and the processor may be integrated into a same chip, or may be respectively disposed on different chips. A type of the memory and a manner of disposing the memory and the processor are not limited in this application.

It should be understood that a related data exchange procedure, for example, sending of indication information, may be a procedure of outputting the indication information from the processor, and receiving of capability information may be a procedure of receiving input capability information by the processor. Specifically, data output by the processor may be output to the transmitter, and input data received by the processor may be from the receiver. The transmitter and the receiver may be collectively referred to as a transceiver.

The processing apparatus in the fifth aspect may be a chip, and the processor may be implemented by hardware or software. When being implemented by hardware, the processor may be a logic circuit, an integrated circuit, or the like; or when being implemented by software, the processor may be a general-purpose processor, and is implemented by reading software code stored in the memory. The memory may be integrated into the processor, or may be located outside the processor and exist alone.

According to a sixth aspect, a computer program product is provided. The computer program product includes a computer program (which may also be referred to as code or instructions), and when the computer program is run, a computer is enabled to perform the method according to any possible implementation in the first aspect.

According to a seventh aspect, a computer-readable storage medium is provided. The computer-readable storage medium stores a computer program (which may also be referred to as code or instructions), and when the computer program runs on a computer, the computer is enabled to perform the method according to any possible implementation in the first aspect.

DESCRIPTION OF EMBODIMENTS

Figure 1:
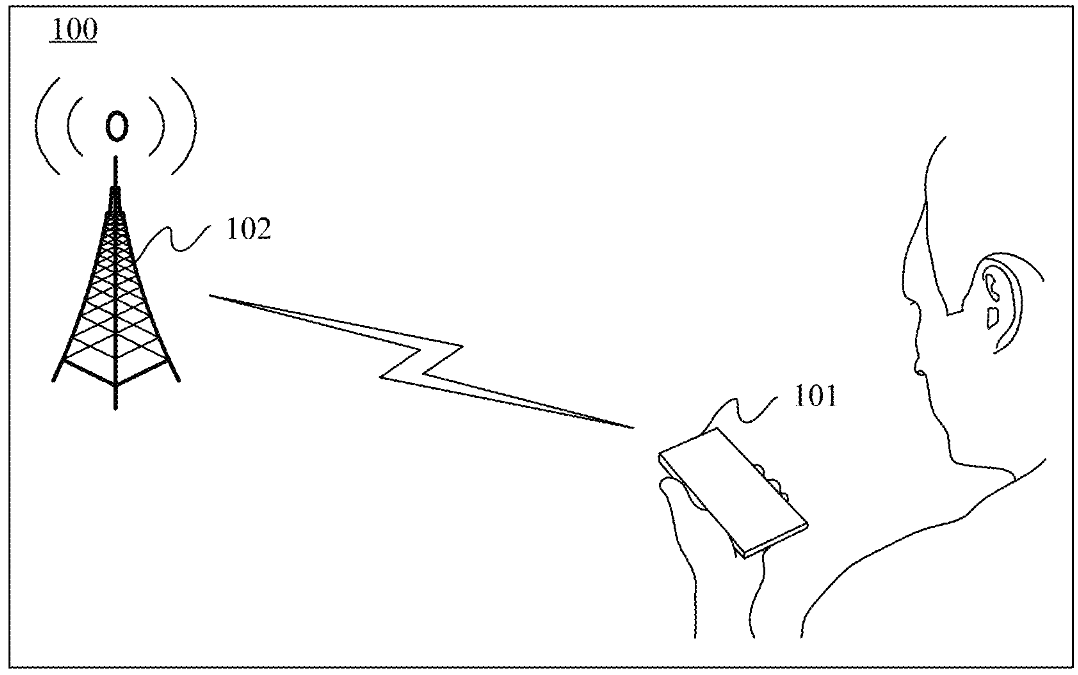
FIG. 1 is a schematic diagram of an application scenario according to an embodiment of this application.

The following describes the technical solutions in this application with reference to the accompanying drawings.

In the embodiments of this application, words such as "first" and "second" are used to distinguish between same items or similar items with basically the same functions and effects. For example, a first value and a second value are merely used to distinguish between different values, but not limit a sequence thereof. A person skilled in the art may understand that the words such as "first" and "second" do not limit a quantity and an execution sequence, and the words such as "first" and "second" do not indicate a definite difference.

It should be noted that the word "example", "for example", or the like in the embodiments of this application is used to represent giving an example, an illustration, or a description. Any embodiment or design solution described as "example" or "for example" in this application should not be construed as being preferred or advantageous over other embodiments or design solutions. Exactly, use of the word "example", "for example", or the like is intended to present a related concept in a specific manner.

In the embodiments of this application, "at least one" means one or more, and "a plurality of" means two or more. "And/Or" describes an association relationship between associated objects, and represents that three relationships may exist. For example, "A and/or B" may represent the following cases: Only A exists, both A and B exist, and only B exists, where A and B may be singular or plural. The character "/" usually represents an "or" relationship between associated objects. "At least one of the following items" or a similar expression thereof means any combination of these items, including a single item or any combination of a plurality of items. For example, at least one of a, b, or c may represent a, b, c, a-b, a-c, b-c, or a-b-c, where a, b, and c may be singular or plural.

A terminal device in the embodiments of this application may also be referred to as user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a user terminal, a terminal, a wireless communication device, a user agent, a user apparatus, or the like.

The terminal device may be a device that provides voice and/or data connectivity to a user, for example, a handheld device or a vehicle-mounted device with a wireless connection function. Currently, some examples of the terminal device include a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device with a wireless communication function, another processing device, a vehicle-mounted device, or a wearable device connected to a wireless modem, a terminal device in a 5G network, or a terminal device in a future evolved public land mobile network (public land mobile network, PLMN). This is not limited in this application.

A network device in this application may be a device that communicates with the terminal device, and the network device may also be referred to as an access network device or a radio access network device. The network device may be a transmission reception point (transmission reception point, TRP), may be an evolved NodeB (evolved NodeB, eNB, or eNodeB) in an LTE system, may be a home eNodeB (for example, home evolved NodeB or home Node B, HNB) or a base band unit (base band unit, BBU), or may be a radio controller in a cloud radio access network (cloud radio access network, CRAN) scenario. Alternatively, the network device may be a relay station, an access point, a vehicle-mounted device, a wearable device, a network device in a 5G network, a network device in a future evolved PLMN network, or the like, may be an access point (access point, AP) in a WLAN, or may be a gNB in an NR system. Alternatively, the network device may be an urban base station, a micro base station, a pico base station, a femto base station, or the like. This is not limited in this application.

The terminal device receives or transmits a signal by using an antenna. A process of receiving or transmitting a signal by using the antenna is a process of receiving or transmitting an electromagnetic wave by using the antenna. When the terminal device transmits the electromagnetic wave by using the antenna, if a human body approaches the terminal device, electromagnetic radiation generated by the terminal device affects the human body. For ease of understanding of this application, the following describes an application scenario of the embodiments of this application with reference to FIG. 1.

FIG. 1 is a schematic diagram of an application scenario 100 according to an embodiment of this application. As shown in FIG. 1, communication between a terminal device 101 and a network device 102 may be specifically that the terminal device 101 sends information to the network device 102, or the terminal device 101 receives information from the network device 102. In this way, an antenna in the terminal device 101 transmits or receives an electromagnetic wave, to generate electromagnetic radiation. When a person holds the terminal device 101, some electromagnetic radiation is absorbed by a human body. Consequently, some performance parameters of the antenna in the terminal device 101 are affected, and the electromagnetic radiation absorbed by the human body affects human health.

It should be understood that FIG. 1 merely shows an example of the application scenario of the embodiments of this application. The embodiments of this application may be, but are not limited to be, applied to the foregoing application scenario. In addition, product forms and quantities of terminal devices 101 and network devices 102 shown in FIG. 1 are merely examples. Larger or smaller quantities all fall within the protection scope of this application; and the product forms of the terminal device 101 and the network device 102 are not specifically limited in this application.

Currently, an SAR is usually used to measure impact of electromagnetic radiation generated by a terminal device on a human body. The SAR refers to an amount of radio frequency energy absorbed by the human body. A lower SAR value represents smaller impact of the electromagnetic radiation generated by the terminal device on the human body. Before the terminal device enters the market for selling, the terminal device usually needs to meet a requirement of an SAR regulation, that is, the SAR of the terminal device needs to be lower than an SAR value specified in the SAR regulation. SAR regulations in different countries may be different or the same. The SAR regulations each specify a value that cannot be exceeded by an SAR of a terminal device. For example, when the SAR regulation specifies 2 W/kg-whole-body exposure, a limit value of an SAR representing whole-body exposure is 2 W/kg.

To reduce the impact of the electromagnetic radiation of the terminal device on the human body and reduce the SAR of the terminal device, an SAR detection device, for example, an SAR sensor, is usually used to detect a use scenario of the antenna in the terminal device. When the human body approaches the antenna in the terminal device, power backoff is usually performed on the antenna in the terminal device, that is, a transmit power of the antenna is reduced, to reduce the SAR of the terminal device. Power backoff performed on the antenna in the terminal device is usually implemented by adjusting a radio frequency circuit connected to the antenna. However, when a plurality of antennas are connected to the radio frequency circuit connected to the antenna, all transmit powers of the plurality of antennas are reduced.

In view of this, an embodiment of this application provides a terminal antenna control method. When an SAR of a terminal device is reduced, power backoff does not need to be performed. In other words, in this embodiment of this application, when a radio frequency conduction power is not changed, it is identified that a human body approaches; and when the SAR needs to be reduced, the conduction power is no longer reduced, and a reflection coefficient of a port of an antenna is increased by adjusting a status of the antenna, thereby decreasing an SAR value.

The following describes in detail the terminal antenna control method in this embodiment of this application with reference to FIG. 2 to FIG. 16. The method may be performed by a terminal device, or may be performed by a chip in a terminal device. This is not specifically limited in this embodiment of this application.

Figure 2:
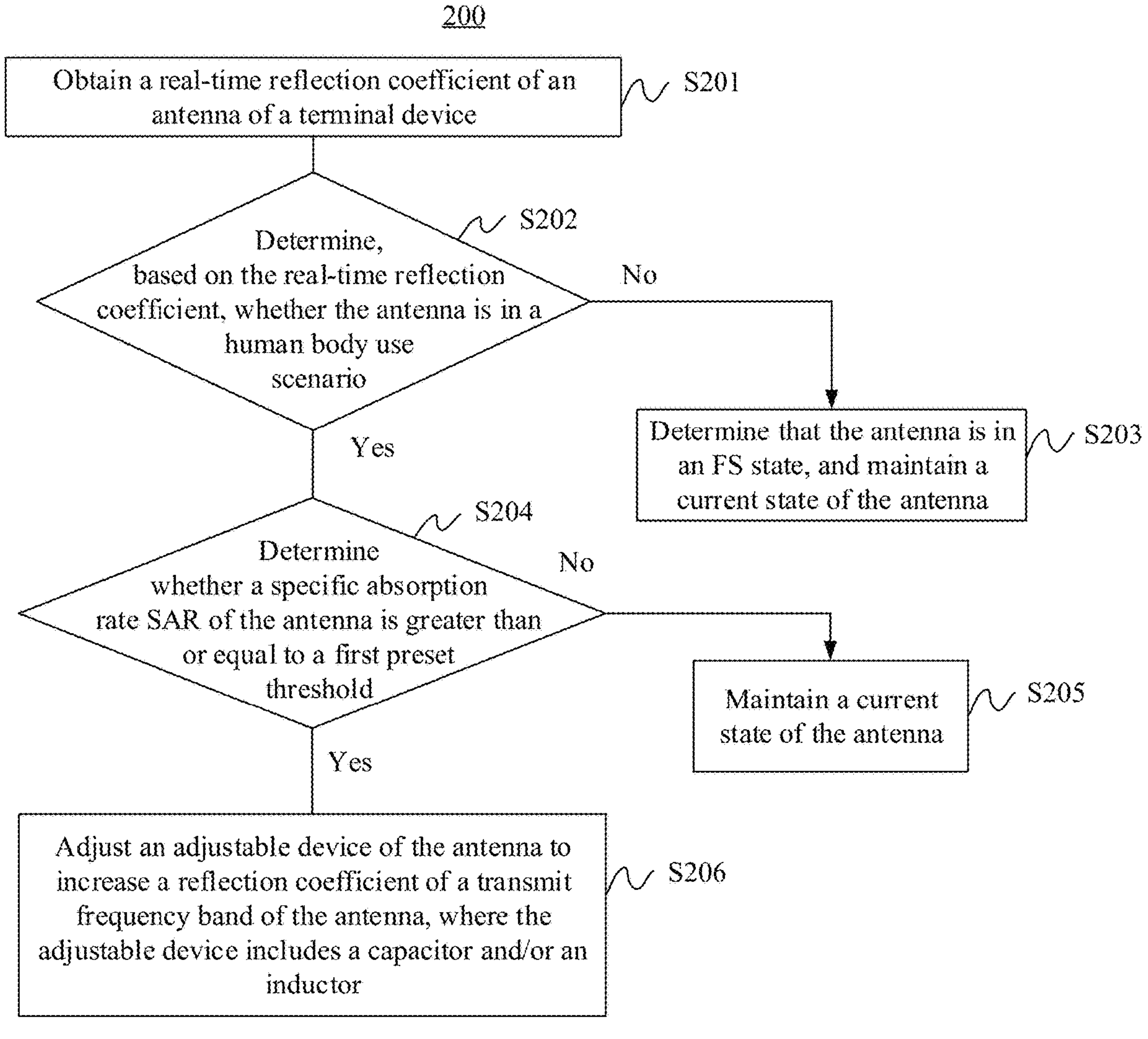
FIG. 2 is a schematic flowchart of a terminal antenna control method according to an embodiment of this application.

FIG. 2 is a schematic flowchart of a terminal antenna control method 200 according to an embodiment of this application. The method 200 may be applied to the foregoing application scenario 100. The method 200 includes the following steps.

S201: Obtain a real-time reflection coefficient of an antenna of a terminal device.

For example, the antenna in this embodiment of this application may be configured to transmit and/or receive an electromagnetic wave signal. A reflection coefficient (denoted by τ in this specification) of the antenna is a value between 0 and 1, that is, $0 \leq \tau \leq 1$. The real-time reflection coefficient is an instantaneous reflection coefficient of the antenna. For example, when a human body approaches the antenna, the real-time reflection coefficient is a reflection coefficient of the antenna that is detected by the terminal device after the human body approaches the antenna.

S202: Determine, based on the real-time reflection coefficient, whether the antenna is in a human body use scenario.

The human body use scenario is a scenario in which the human body uses the terminal device, that is, a scenario in which the human body approaches the antenna in the terminal device.

S203: If the antenna is not in the human body use scenario, determine that the antenna is in a free space (free space, FS) state, maintain a current state of the antenna, and end a procedure of the method.

If the antenna is not in a human body use state, it indicates that there is a large distance between the human body and the antenna. In this case, transmission performance of the antenna is not affected, that is, the antenna is in the FS state. In this case, it is already determined that electromagnetic radiation generated by the terminal device does not affect the human body, and only the current state of the antenna needs to be maintained.

S204: If the antenna is in the human body use scenario, determine whether a specific absorption rate SAR of the antenna is greater than or equal to a first preset threshold.

For example, the first preset threshold may be a value of an SAR specified in an SAR regulation, for example, 2 W/kg. When the antenna is in the human body use scenario, the human body absorbs some radio frequency energy of the antenna in the terminal device. Consequently, the human body is affected. In this case, the terminal device may determine whether an amount of the radio frequency energy absorbed by the human body is excessive, that is, determine, based on an SAR value of the antenna in the terminal device, the radio frequency energy absorbed by the human body. It should be understood that, in this embodiment of this application, an SAR of the terminal device is equivalent to the SAR of the antenna in the terminal device.

S205: If the SAR is less than the first preset threshold, maintain a current state of the antenna, and end a procedure of the method.

If the detected SAR of the antenna is less than the first preset threshold, it indicates that the SAR of the antenna meets a requirement of the SAR regulation. In this case, the current state of the antenna does not need to be adjusted.

S206: If the SAR is greater than or equal to the first preset threshold, adjust an adjustable device of the antenna to increase a reflection coefficient of a transmit frequency band of the antenna, where the adjustable device includes a capacitor and/or an inductor.

Specifically, if the SAR is greater than or equal to the first preset threshold, it indicates that the SAR of the antenna in the terminal device does not meet the requirement of the SAR regulation, and the SAR needs to be reduced. Reduction of the SAR of the antenna may be implemented by increasing the reflection coefficient of the transmit frequency band of the antenna. The reflection coefficient of the transmit frequency band of the antenna may be increased by adjusting the adjustable device in the antenna, the adjustable device of the antenna may be a capacitor and/or an inductor, and there may be one or more capacitors and one or more inductors. Optionally, the adjustable device of the antenna may further include a switch. This is not specifically limited in this embodiment of this application.

In the terminal antenna control method provided in this embodiment of this application, the adjustable device in the antenna is adjusted to increase the reflection coefficient of the transmit frequency band of the antenna, thereby reducing the SAR of the antenna. By using this method, the SAR of the antenna can be reduced, and the impact of the electromagnetic radiation generated by the terminal device on the human body can be reduced. In addition, power backoff does not need to be performed on the antenna, so that the foregoing method does not affect wireless transmission performance of another antenna other than the antenna.

In an optional embodiment, S202 may be implemented in the following manner: calculating a distance difference between locations that are of the real-time reflection coefficient and a free space FS reflection coefficient of the antenna and that are on a Smith chart; determining whether the distance difference is greater than or equal to a second preset threshold; and if the distance difference is greater than the second preset threshold, determining that the antenna is in the human body use scenario.

It may be understood that when the human body approaches the antenna, the reflection coefficient of the antenna is changed, so that the real-time reflection coefficient of the antenna is different from the FS reflection coefficient.

In a possible implementation, the terminal device may determine a first coordinate point of the real-time reflection coefficient on the Smith chart and a second coordinate point of the FS reflection coefficient of the antenna on the Smith chart, calculate a distance between the first coordinate point and the second coordinate point, and determine the distance as the distance difference.

It should be understood that the Smith chart is a calculation chart that is plotted with a normalized input impedance (or admittance) equivalent circle family on a reflection coefficient plane, and the reflection coefficient of the antenna can be represented on the Smith chart. In the Smith chart, a reflection coefficient of a point closer to a center of a circle is closer to 0, and a reflection coefficient of a point farther from the center of the circle is closer to 1. A reflection coefficient of a point on a circumference of the Smith chart is 1, a reflection coefficient of the center of the circle is 0, and the reflection coefficient of the antenna may be any value between 0 and 1.

Figure 3:
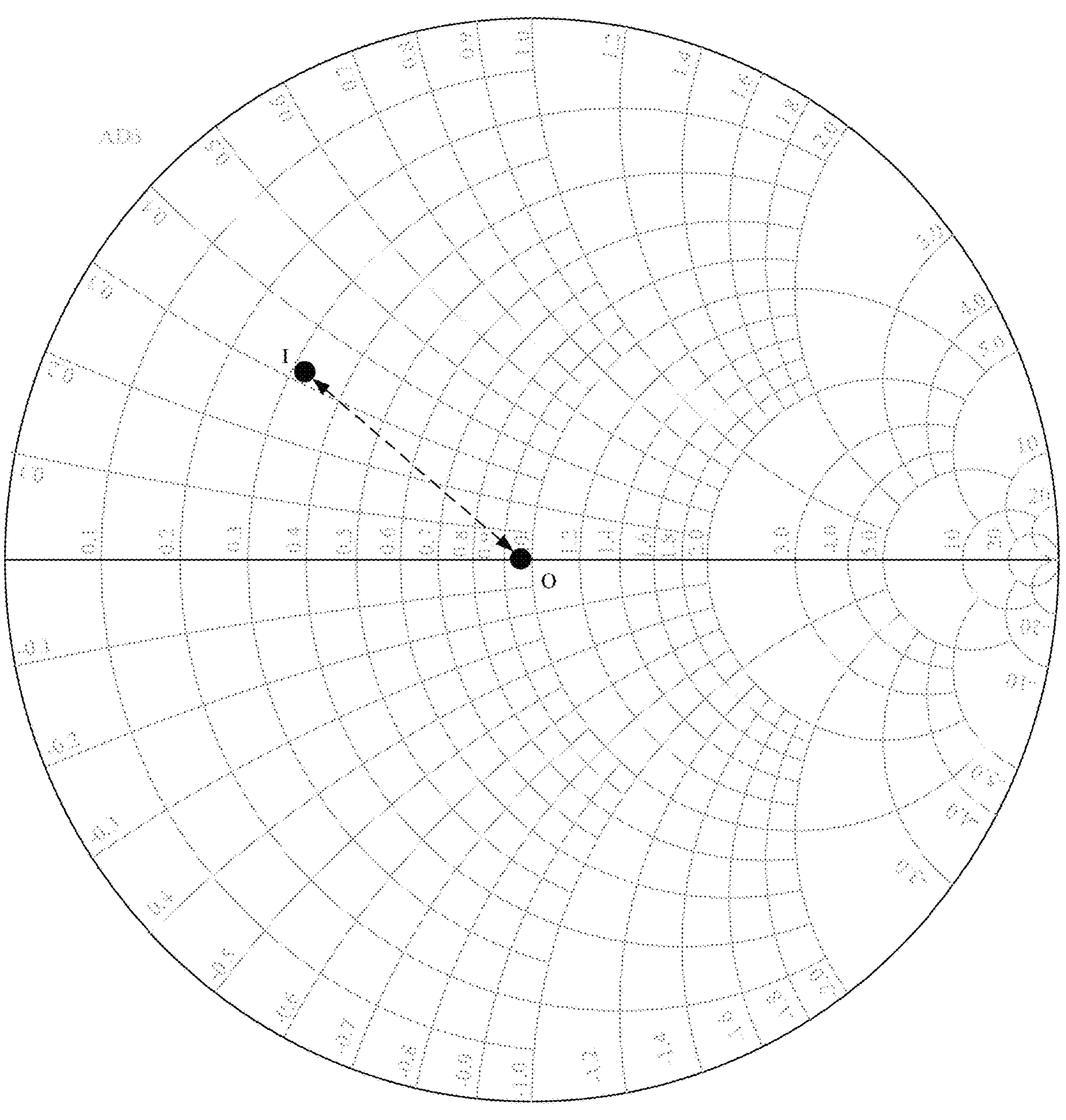
FIG. 3 is a schematic diagram of locations of different reflection coefficients on a Smith chart according to an embodiment of this application.

The following describes in detail locations of points with different reflection coefficients on the Smith chart with reference to FIG. 3.

FIG. 3 is a schematic diagram of locations of different reflection coefficients on a Smith chart according to an embodiment of this application. In FIG. 3, a point O represents a coordinate point of the reflection coefficient of the antenna in the FS state on the Smith chart, namely, the second coordinate point. When the human body approaches the antenna, the reflection coefficient of the antenna changes. In this case, the reflection coefficient of the antenna is referred to as a real-time reflection coefficient. The location of the real-time reflection coefficient on the Smith chart deviates from the location of the FS reflection coefficient of the antenna on the Smith chart, and corresponds to a point I in FIG. 3, namely, the first coordinate point. When the human body gets closer to the antenna, the human body has greater impact on performance of the antenna, and a degree of a change of the reflection coefficient of the antenna is larger. In this case, the distance between the first coordinate point and the second coordinate point is larger. Therefore, in this embodiment of this application, whether the antenna is in the human body use scenario is determined based on the distance between the first coordinate point and the second coordinate point.

It should be understood that the second preset threshold is a preset value of the distance between the first coordinate point and the second coordinate point. When the distance between the first coordinate point and the second coordinate point is greater than or equal to the second preset threshold, it indicates that the human body is close to the antenna, and has great impact on the antenna, and the antenna is in the human body use scenario. Otherwise, it indicates that the human body is far from the antenna, the human body has small impact on wireless performance of the antenna, and the antenna is in the FS state.

When the antenna is in the human body use state, the terminal device may further determine a distance between the human body and the antenna based on the distance between the first coordinate point and the second coordinate point.

It should be understood that before the terminal device enters the market for selling, an SAR in a scenario in which the distance between the antenna and the human body is 5 mm and an SAR in a scenario in which the distance between the antenna and the human body is 0 mm are usually detected. In addition, the SAR regulation has different requirements for the SAR in the scenario in which the distance between the antenna and the human body is 5 mm and the SAR in the scenario in which the distance between the antenna and the human body is 0 mm.

Specifically, when the distance between the antenna in the terminal device and the human body is 5 mm, a location of a detected reflection coefficient of the antenna on the Smith chart is a third coordinate point; and when the distance between the antenna in the terminal device and the human body is 0 mm, a location of a detected reflection coefficient of the antenna on the Smith chart is a fourth coordinate point. It is assumed that the distance between the first coordinate point and the second coordinate point is L3, a distance between the third coordinate point and the second coordinate point is L1, and a distance between the fourth coordinate point and the second coordinate point is L2. When $L1-a1 \leq L3 \leq L1+a1$, the distance between the antenna and the human body is 5 mm, and $0 \leq a1 \leq L1$. When $L2-a2 \leq L3 \leq L2+a2$, the distance between the antenna and the human body is 0 mm, and $0 \leq a2 \leq L2$. a1 and a2 are preset values.

Figure 4:
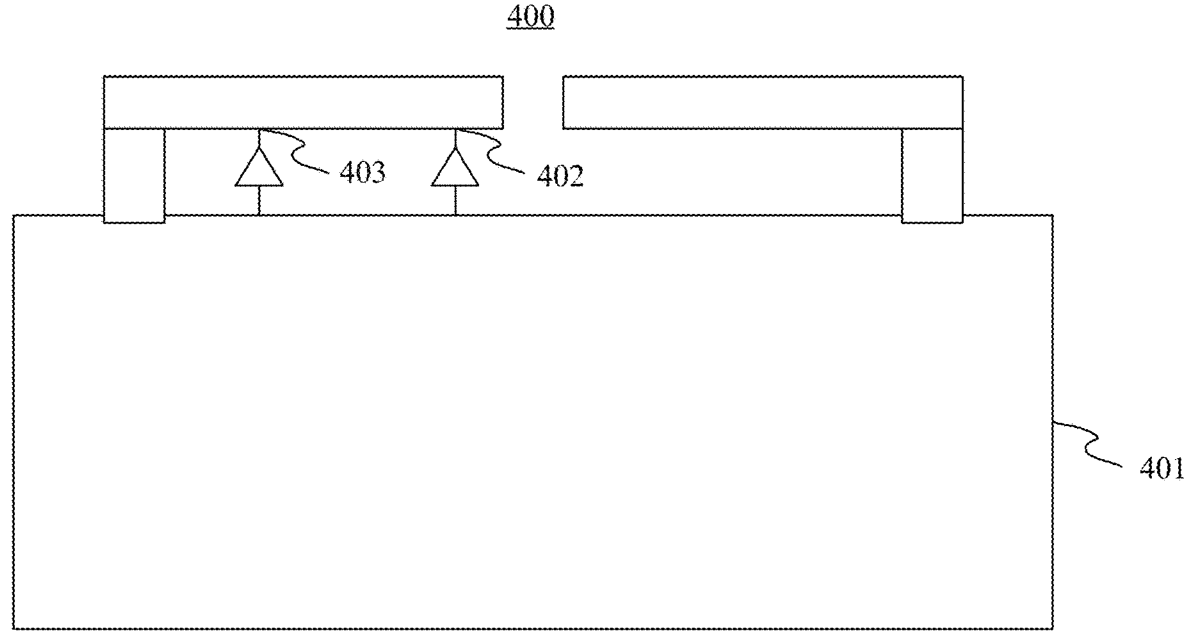
FIG. 4 is a schematic diagram of a structure of an antenna according to an embodiment of this application.

The following describes in detail a structure of the antenna in the foregoing method 200 with reference to FIG. 4.

FIG. 4 is a schematic diagram of a structure of an antenna 400 according to an embodiment of this application. As shown in FIG. 4, the antenna 400 includes an antenna panel 401, a feed port 402, and a switch tuning location 403. The feed port 402 is configured to feed a current. The switch tuning location 403 is configured to tune a resonance frequency of the antenna.

Figure 5:
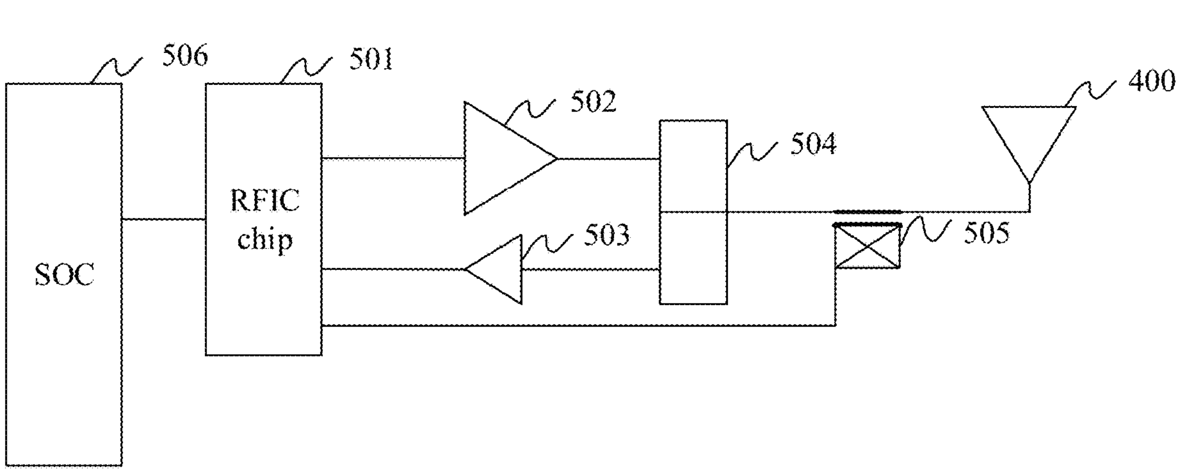
FIG. 5 is a schematic diagram of a structure of a radio frequency circuit according to an embodiment of this application.

In a possible implementation, the real-time reflection coefficient of the antenna may be detected by using a radio frequency circuit 500 shown in FIG. 5.

FIG. 5 is a schematic diagram of a structure of a radio frequency circuit 500 according to an embodiment of this application. As shown in FIG. 5, the radio frequency circuit 500 includes an integrated baseband chip (system on a chip, SOC) 506, a radio frequency integrated circuit (radio frequency integrated circuit, RFIC) chip 501, a power amplifier 502, a low-noise amplifier 503, a switch 504, and a coupler 505. The SOC 506 is connected to one end of the RFIC chip 501, the other end of the RFIC chip 501 is connected to the power amplifier 502 and the low-noise amplifier 503, the other end of the power amplifier 502 and the other end of the low-noise amplifier 503 are connected to the switch 504, and the other end of the switch 504 is connected to the antenna 400. The coupler 505 is configured to detect an incident power and a reflection power of the antenna 400, and send the detected reflection power and incident power to the RFIC chip 501. The RFIC chip 501 is configured to receive the incident power and the reflection power that are detected by the coupler 505, calculate the reflection coefficient of the antenna 400 based on the received incident power and reflection power, and send the reflection coefficient to the SOC 506. The SOC 506 has functions of chips such as the integrated baseband chip, a CPU, a graphics processing unit, and an embedded neural-network processing unit (neural-network processing unit, NPU), and is configured to process received data, and control and adjust a capacitor and/or an inductor in a circuit.

It should be understood that FIG. 5 merely shows an example of the radio frequency circuit according to this embodiment of this application. Devices in the radio frequency circuit are merely examples, and more or fewer devices all fall within the protection scope of this application. For example, the radio frequency circuit 500 may further include a filter, a frequency converter, and the like, and the radio frequency circuit 500 may further include more antennas and/or branch antennas. This is not limited in this embodiment of this application.

Figure 6:
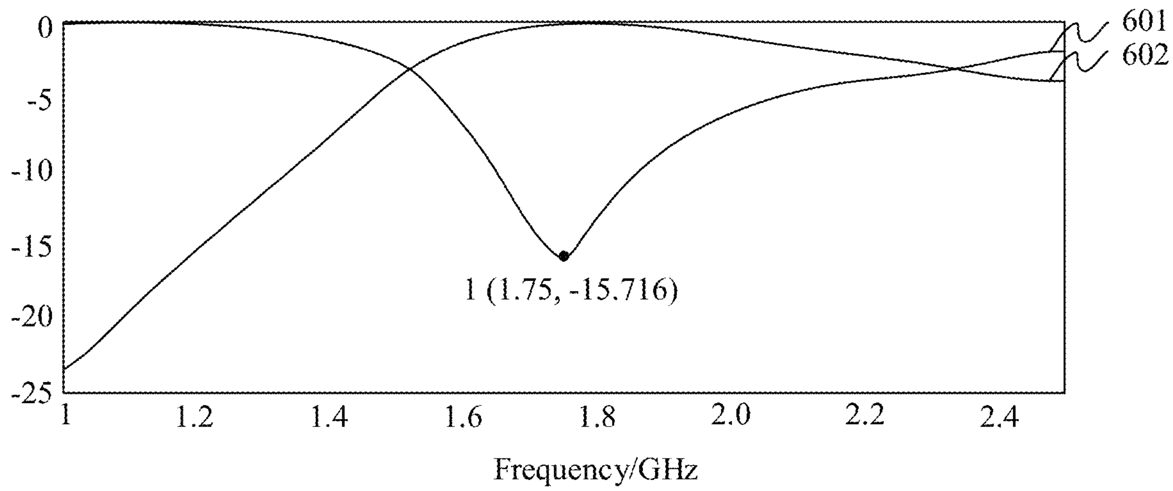
FIG. 6 is a schematic diagram of a reflection coefficient curve and an efficiency curve of an antenna according to an embodiment of this application.

FIG. 6 is a schematic diagram of a reflection coefficient curve and an efficiency curve of an antenna according to an embodiment of this application. As shown in FIG. 6, a curve 601 is the reflection coefficient curve of the antenna, and a curve 602 is the efficiency curve of the antenna.

In FIG. 6, a vertical coordinate corresponding to the reflection coefficient curve 601 is a value related to the reflection coefficient detected by the foregoing radio frequency circuit 500, the value is 10*|g|τ|, and |g|τ| represents that a logarithm operation is performed on |τ| by using 10 as a base. A vertical coordinate corresponding to the efficiency curve 602 is a logarithm of efficiency of the antenna, and the efficiency of the antenna is a ratio of a power radiated from the antenna to an effective power input to the antenna, and is a value that is always less than 1. It can be seen from FIG. 6 that when the antenna operates at a resonance frequency of 1.75 GHZ, the value related to the reflection coefficient is −15.716 on the reflection coefficient curve 601 of the antenna. When the reflection coefficient of the antenna is the lowest, the efficiency of the antenna is the highest on the efficiency curve 602 of the antenna.

Figure 7:
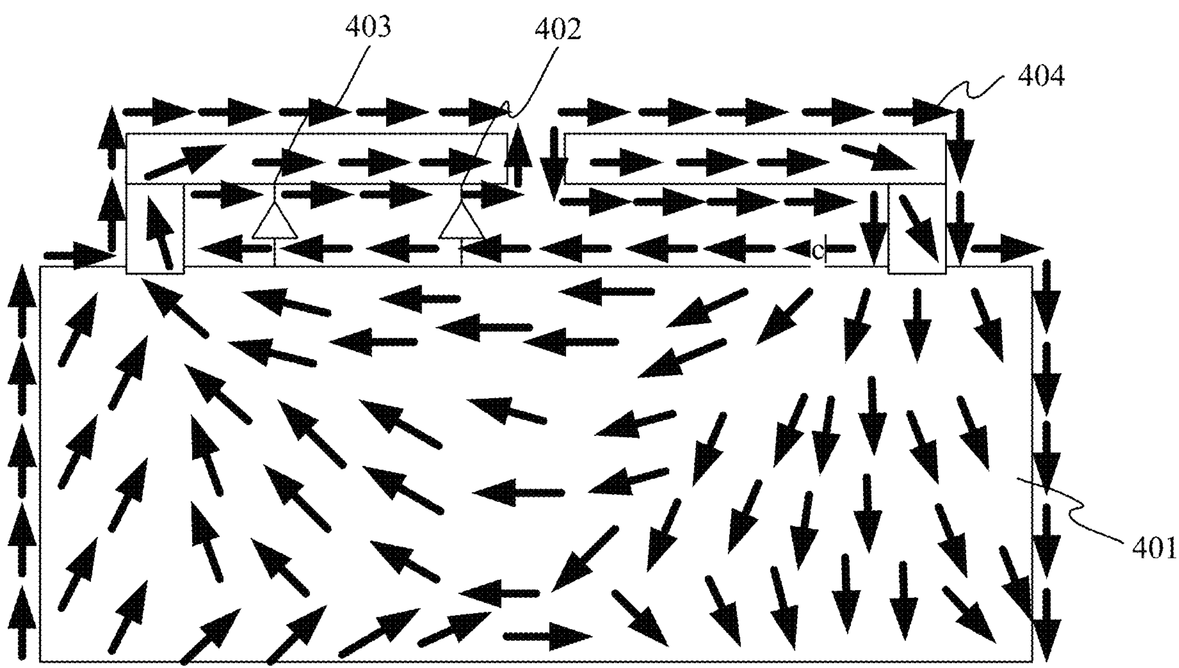
FIG. 7 is a schematic diagram of current distribution of an antenna according to an embodiment of this application.

When a frequency of the antenna operates at 1.75 GHz, a bandwidth of the antenna can effectively cover a frequency band B3. The frequency band B3 is a specific uplink/downlink frequency band of the antenna. For example, the frequency band B3 may be an uplink frequency band of 1.710 GHz-1.785 GHz or a downlink frequency band of 1.805 GHZ-1.880 GHz. That is, a frequency band in which the antenna transmits an electromagnetic wave to a network device is 1.710 GHz-1.785 GHz, and a frequency band in which the antenna receives an electromagnetic wave transmitted by the network device is 1.805 GHZ-1.880 GHz. In this case, current distribution of the antenna may be shown in FIG. 7. FIG. 7 is a schematic diagram of current distribution of an antenna 400 according to an embodiment of this application. Arrows 404 in FIG. 7 are used to represent current directions in different components of the antenna 400.

When the human body approaches the antenna, the performance of the antenna is affected. Consequently, some performance parameters of the antenna change. Therefore, when the antenna is in the human body use scenario, the reflection coefficient of the antenna changes. In this way, the terminal device can determine, based on the real-time reflection coefficient of the antenna, whether the antenna is in the human body use scenario. In this embodiment of this application, the terminal device may determine, based on the reflection coefficient detected by the foregoing radio frequency circuit 500, whether the antenna is in the human body use scenario. The following describes in detail the human body use scenario with reference to FIG. 8.

Figure 8:
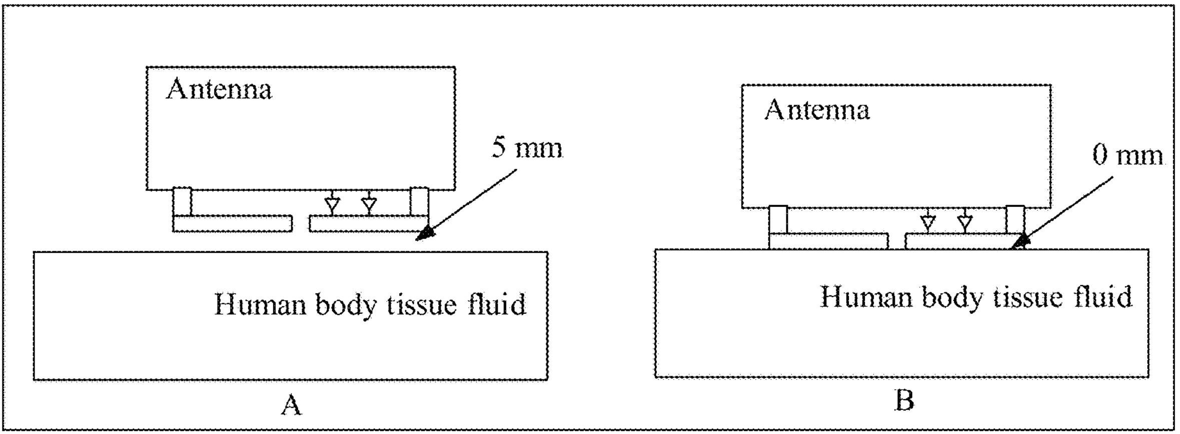
FIG. 8 is a schematic diagram of an antenna in a human body use scenario according to an embodiment of this application.

FIG. 8 is a schematic diagram of an antenna in a human body use scenario according to an embodiment of this application. As shown in FIG. 8, the antenna may be the antenna 400 shown in FIG. 4. When the human body approaches the antenna, human body tissue fluid includes a large quantity of electrolytes, and therefore, some radio frequency energy is absorbed. This affects the performance of the antenna. A scenario A in FIG. 8 is a schematic diagram in which the antenna is in the human body use scenario when the distance between the antenna and the human body is 5 mm. A scenario B in FIG. 8 is a schematic diagram in which the antenna is in the human body use scenario when the distance between the antenna and the human body is 0 mm. Before the terminal device enters the market for selling, the SAR in the scenario in which the distance between the antenna and the human body is 5 mm and the SAR in the scenario in which the distance between the antenna and the human body is 0 mm are usually detected, to test whether the terminal device meets the requirement of the SAR regulation.

Figure 9:
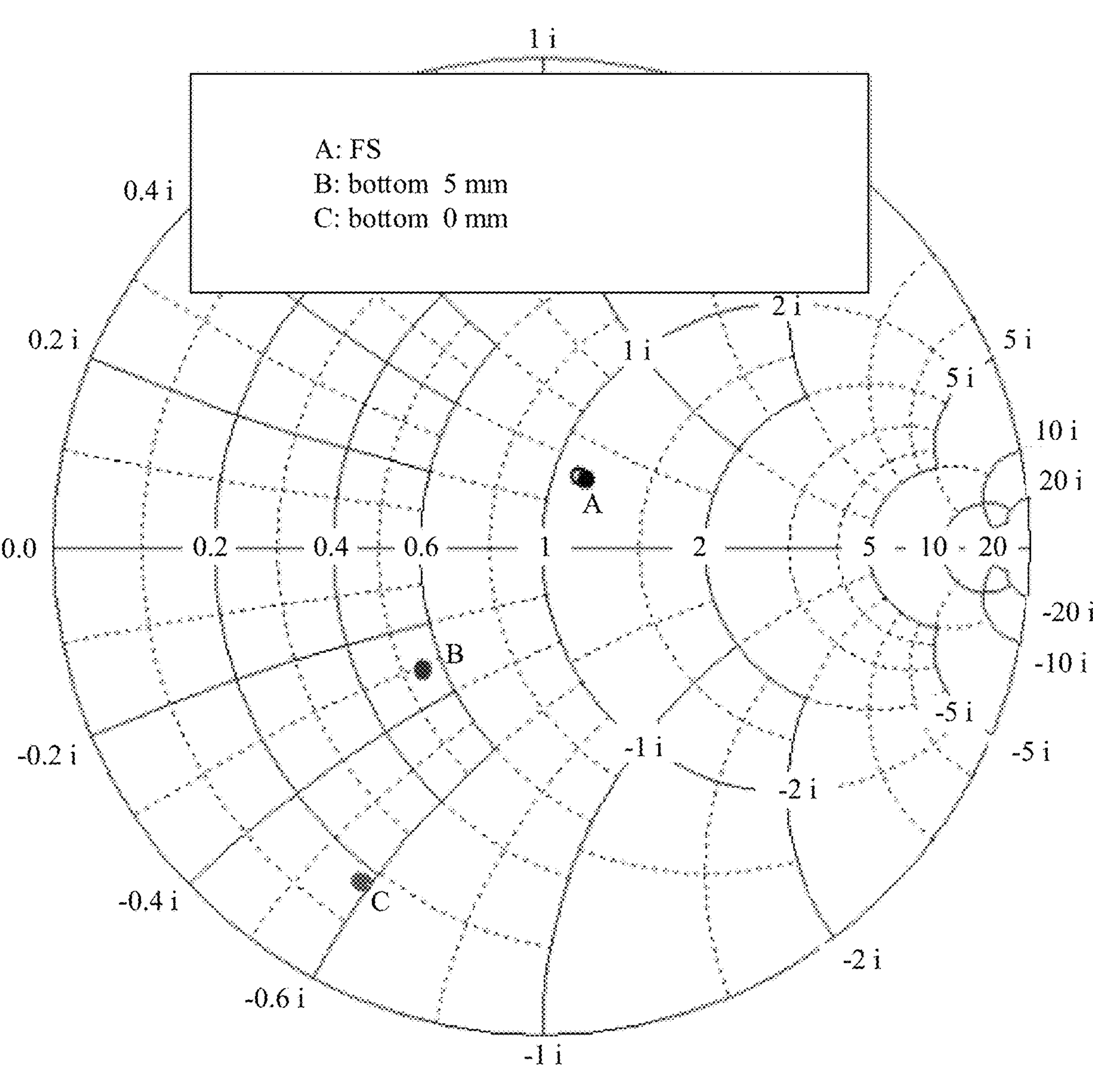
FIG. 9 is a schematic diagram of locations of reflection coefficients of an antenna in different scenarios on a Smith chart according to an embodiment of this application.

The following describes in detail different reflection coefficients of the antenna in different scenarios with reference to FIG. 9.

FIG. 9 is a schematic diagram of locations of reflection coefficients of an antenna in different scenarios on a Smith chart according to an embodiment of this application. As shown in FIG. 9, a point A is the reflection coefficient of the antenna when the antenna is in the FS state; a point B is the reflection coefficient of the antenna when the distance between the antenna and the human body is 5 mm; and a point C is the reflection coefficient of the antenna when the distance between the antenna and the human body is 0 mm. It can be seen from the figure that, as the scenario in which the antenna is located and the distance between the human body and the antenna change, the reflection coefficient of the antenna continuously changes.

In this embodiment of this application, a value of the capacitor and/or the inductor in the antenna is adjusted, to increase the reflection coefficient of the transmit frequency band of the antenna, so that the SAR value of the antenna is decreased. It should be understood that an uplink frequency band and a downlink frequency band of a specific antenna are determined. For example, it is assumed that the uplink frequency band of the antenna is 1.710 GHz-1.785 GHZ, and the downlink frequency band is 1.805 GHZ-1.880 GHz. The uplink frequency band is a frequency band in which the antenna transmits a signal, and relates to transmit performance of the antenna. The downlink frequency band is a frequency band in which the antenna receives a signal, and relates to reception performance of the antenna. The SAR of the antenna relates to only a process in which the antenna transmits a signal, that is, it is only considered that the SAR of the antenna meets the requirement of the SAR regulation in the process in which the antenna transmits a signal.

The resonance frequency of the antenna may be adjusted by adjusting the adjustable device of the antenna, so that the reflection coefficient of the antenna changes when the uplink frequency band and the downlink frequency band of the antenna are unchanged. If the reflection coefficient of the uplink frequency band of the antenna increases, the SAR of the antenna is reduced.

For example, the adjustable device of the antenna may be adjusted by using the SOC 506 in the radio frequency circuit 500 shown in FIG. 5, to increase the reflection coefficient of the transmit frequency band of the antenna. In the radio frequency circuit, the SOC 506 may adjust the adjustable device of the antenna by using a mobile industry processor interface (mobile industry processor interface, MIPI)/a general purpose input output expander (general purpose input output, GPIO), to increase the reflection coefficient of the transmit frequency band of the antenna, and reduce the SAR of the antenna.

In a possible implementation, the terminal device may increase the transmission coefficient of the transmit frequency band of the antenna by adjusting a capacitance of the antenna.

For example, the terminal device adjusts the capacitance of the antenna from a first value to a second value, to increase the reflection coefficient of the transmit frequency band of the antenna, and further reduce the SAR of the antenna, where the second value is less than the first value. The first value and the second value each may be, for example, 1.4 picofarads (pF), 0.8 pF, or the like.

Figure 10:
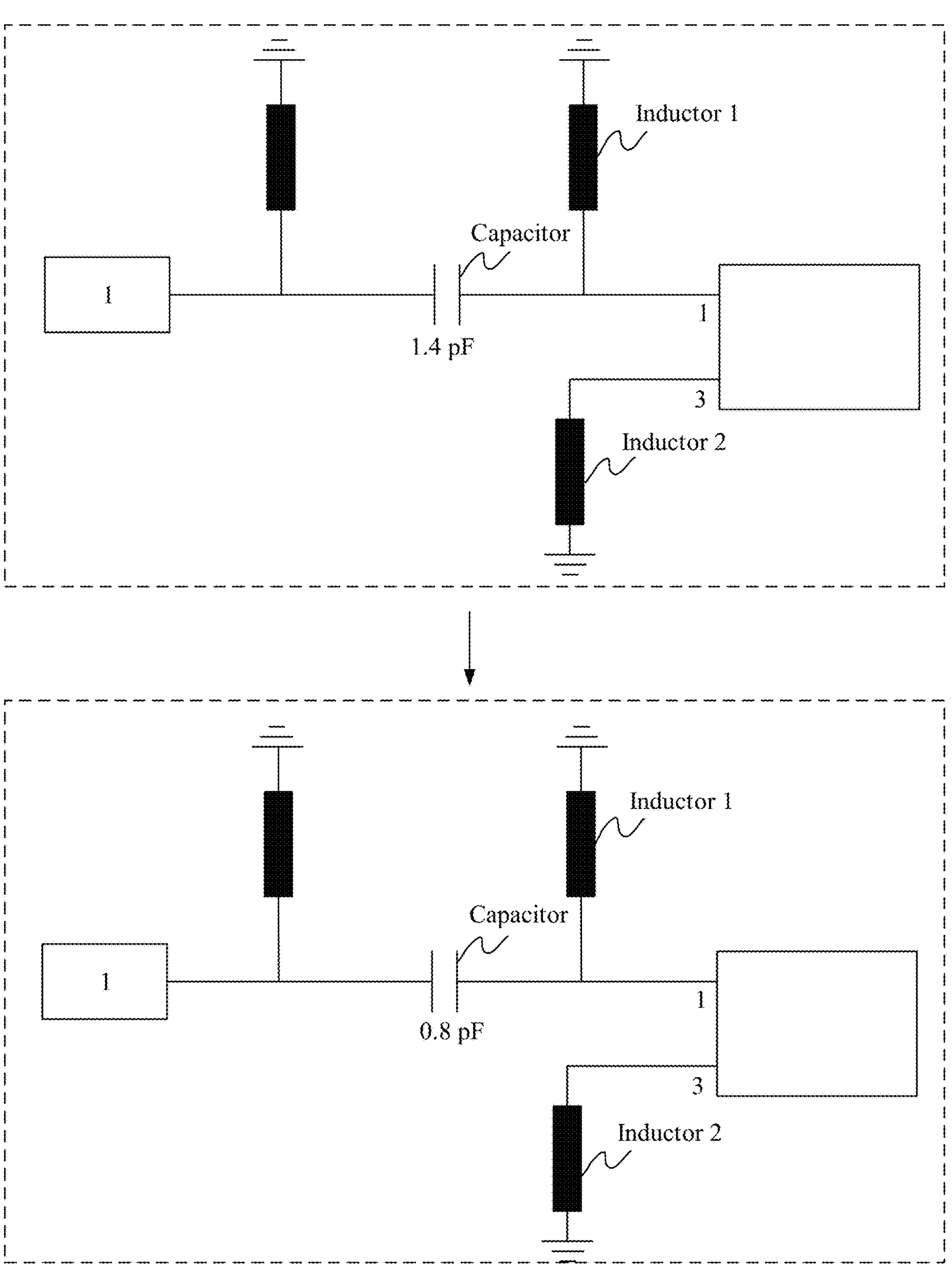
FIG. 10 is a schematic diagram of capacitance adjustment according to an embodiment of this application.

FIG. 10 is a schematic diagram of capacitance adjustment according to an embodiment of this application. As shown in FIG. 10, in a circuit shown in FIG. 10, 1 is a feed port of the antenna, and 3 is a switch tuning location of the antenna. The terminal device may adjust the capacitance of the antenna from 1.4 pF to 0.8 pF by using the radio frequency circuit 500 shown in FIG. 5.

Figure 11:
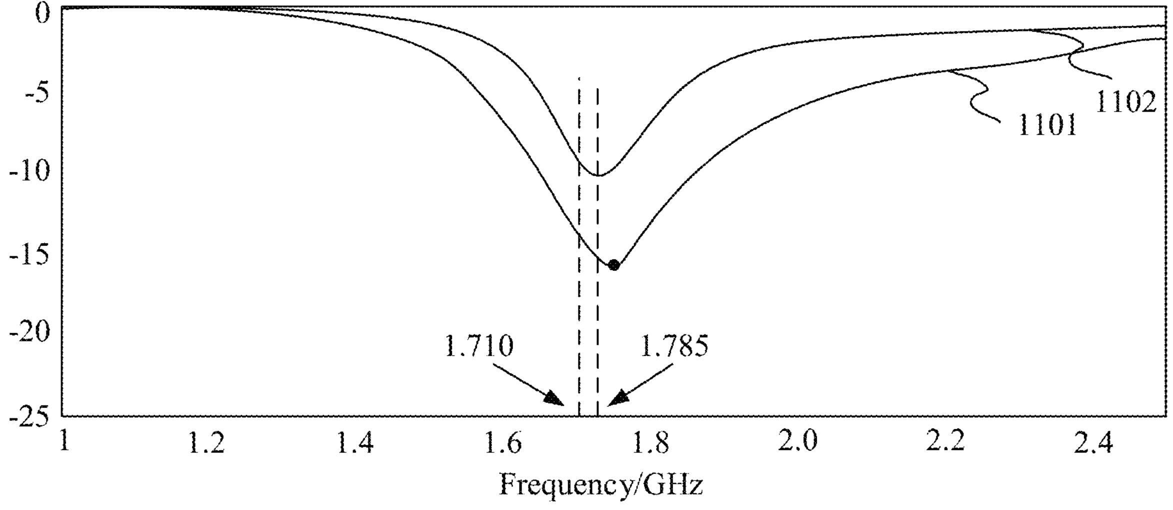
FIG. 11 is a schematic diagram of reflection coefficient curves of an antenna before and after capacitance adjustment according to an embodiment of this application.

After the capacitance of the antenna decreases, the reflection coefficient curve of the antenna changes as shown in FIG. 11. FIG. 11 is a schematic diagram of reflection coefficient curves of an antenna before and after capacitance adjustment according to an embodiment of this application. A curve 1101 is a reflection coefficient curve of the antenna when the capacitor of the antenna is 1.4 pF; and a curve 1102 is a reflection coefficient curve of the antenna when the capacitor of the antenna is 0.8 pF. It can be seen from FIG. 11 that the capacitance of the antenna is decreased, and the reflection coefficient curve of the antenna changes. For example, if the uplink frequency band of the antenna is 1.710 GHZ-1.785 GHz, after the capacitance of the antenna is adjusted, a corresponding reflection coefficient of the antenna at each frequency correspondingly increases, so that the reflection coefficient of the antenna increases in the uplink frequency band.

For example, reflection coefficients of the antenna in different human body-antenna distance scenarios may be detected by using the radio frequency circuit 500 shown in FIG. 5 before and after capacitance adjustment. A detection result is shown in FIG. 12.

Figure 12:
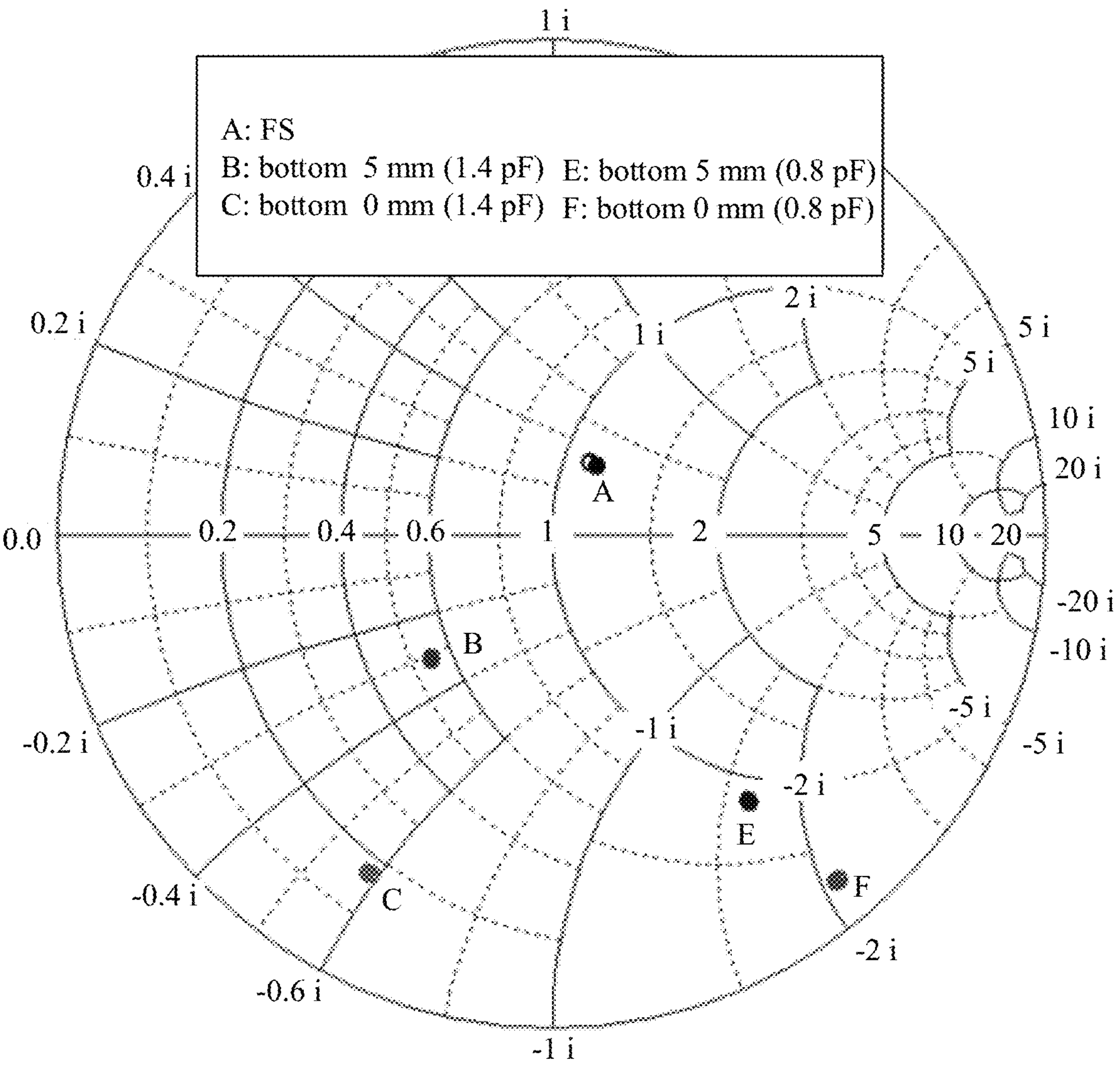
FIG. 12 is a schematic diagram of locations of reflection coefficients of an antenna on a Smith chart before and after capacitor adjustment according to an embodiment of this application.

FIG. 12 is a schematic diagram of locations of reflection coefficients of an antenna on a Smith chart before and after capacitor adjustment according to an embodiment of this application. As shown in FIG. 12, a point B is a location of the reflection coefficient of the antenna on the Smith chart when the capacitor is 1.4 pF and the human body is 5 mm away from the antenna; a point E is a location of the reflection coefficient of the antenna on the Smith chart when the capacitor is 0.8 pF and the human body is 5 mm away from the antenna; a point C is a location of the reflection coefficient of the antenna on the Smith chart when the capacitor is 1.4 pF and the human body is 0 mm away from the antenna; and a point F is a location of the reflection coefficient of the antenna on the Smith chart when the capacitor is 0.8 pF and the human body is 0 mm away from the antenna. It can be seen from FIG. 12 that a distance between the point E and the center of the circle of the Smith chart is greater than a distance between the point B and the center of the circle of the Smith chart, and a distance between the point F and the center of the circle of the Smith chart is greater than a distance between the point C and the center of the circle of the Smith chart; and correspondingly, a distance between the point E and the circumference of the Smith chart is less than a distance between the point B and the circumference of the Smith chart, and a distance between the point F and the circumference of the Smith chart is less than a distance between the point C and the circumference of the Smith chart. It indicates that the reflection coefficient of the transmit frequency band of the antenna increases after the capacitance of the antenna is adjusted.

In this embodiment of this application, SARs and conduction power differences of the antenna that are obtained before and after capacitor adjustment at different resonance frequencies are shown in Table 1.

TABLE 1

The SARs and the conduction power differences of the antenna that are obtained before and after capacitor adjustment

| | Initial SAR-series 1.4 pF | | Adjusted SAR-series 0.8 pF | | Power difference | |
|---|---|---|---|---|---|---|
| Resonance frequency | Bottom 0 mm | Bottom 5 mm | Bottom 0 mm | Bottom 5 mm | Bottom 0 mm | Bottom 5 mm |
| 1.71 GHz | 2.83 | 1.79 | 1.23 | 1.08 | −3.6 | −2.2 |
| 1.75 GHz | 2.94 | 1.84 | 1.33 | 1.14 | −3.4 | −2.1 |
| 1.78 GHz | 3.03 | 1.87 | 1.41 | 1.19 | −3.3 | −2.0 |

It can be learned from Table 1 that, as a series capacitance of the antenna decreases, the SAR of the antenna is reduced. In addition, the conduction power of the antenna is not affected.

It should be understood that FIG. 10 merely shows an example in which the terminal device increases the reflection coefficient of the antenna by adjusting the capacitance. In a different case, the terminal device may adjust the capacitance of the antenna based on the location of the real-time reflection coefficient of the antenna on the Smith chart and an internal circuit structure of the antenna. For example, when one capacitor is connected in series to the antenna, and the location of the real-time reflection coefficient of the antenna on the Smith chart is located above a pure resistance line, the terminal device may increase a capacitance of the capacitor, to increase the reflection coefficient of the transmit frequency band of the antenna. The pure resistance line is a straight line passing through the center of the circle of the Smith chart.

In another possible implementation, the terminal device may increase the reflection coefficient of the transmit frequency band of the antenna by adjusting an inductance of the antenna.

For example, the terminal device adjusts the inductance of the antenna from a third value to a fourth value, to increase the reflection coefficient of the transmit frequency band of the antenna, and further reduce the SAR of the antenna, where the fourth value is less than the third value. The third value and the fourth value each may be, for example, 4 nanohenries (nH), 6 nH, or the like.

Figure 13:
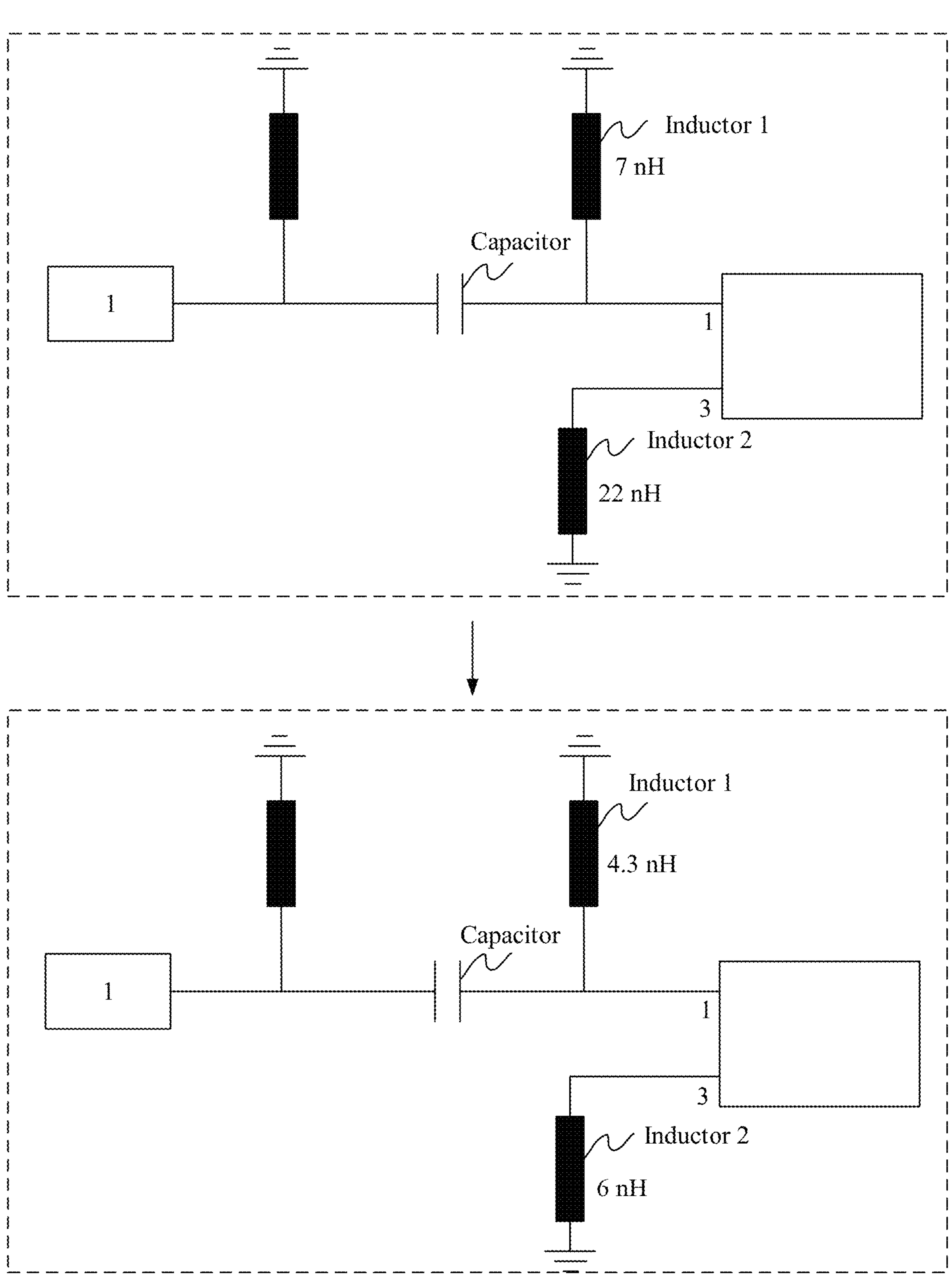
FIG. 13 is a schematic diagram of inductor adjustment according to an embodiment of this application.

FIG. 13 is a schematic diagram of inductor adjustment according to an embodiment of this application. As shown in FIG. 13, in a circuit shown in FIG. 13, 1 is a feed port of the antenna, and 3 is a switch tuning location of the antenna. For example, the terminal device may adjust an inductor 1 of the antenna from 7 nH to 4.3 nH and adjust an inductor 2 from 22 nH to 6 nH by using the radio frequency circuit 500 shown in FIG. 5. After the inductance of the antenna decreases, the reflection coefficient curve of the antenna changes as shown in FIG. 14.

Figure 14:
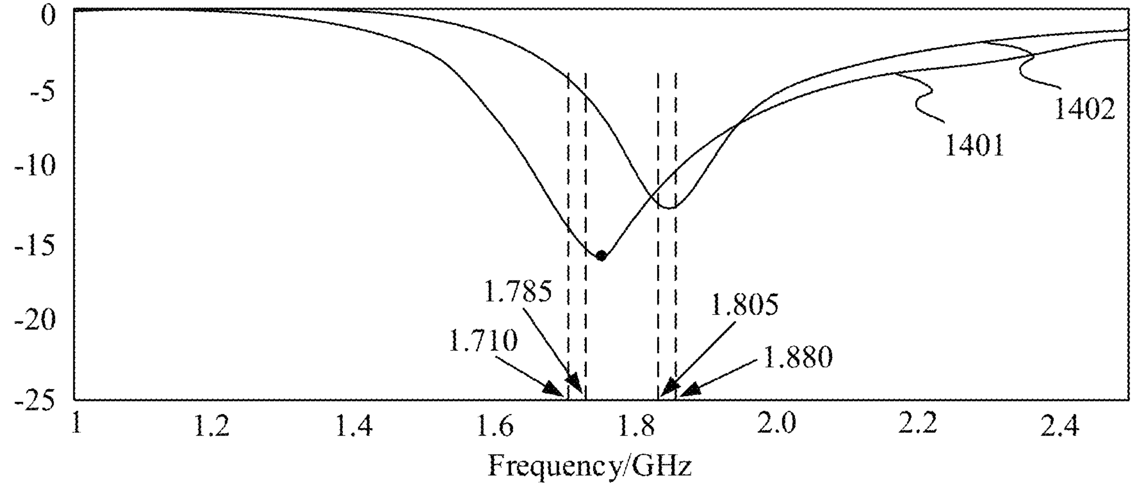
FIG. 14 is a schematic diagram of reflection coefficient curves of an antenna before and after inductance adjustment according to an embodiment of this application.

FIG. 14 is a schematic diagram of reflection coefficient curves of an antenna before and after inductance adjustment according to an embodiment of this application. A curve 1401 is a reflection coefficient curve of the antenna when the inductor 1 in the antenna is 7 nH and the inductor 2 is 22 nH; and a curve 1402 is a reflection coefficient curve of the antenna when the inductor 1 in the antenna is 4.3 nH and the inductor 2 is 6 nH. It can be learned that the reflection coefficient curve of the antenna is changed by adjusting the inductance of the antenna, and a resonance frequency band of the antenna is integrally shifted to a reception direction. For example, if the uplink frequency band of the antenna is 1.710 GHZ-1.785 GHZ, after inductances of the inductor 1 and the inductor 2 of the antenna decrease, a corresponding reflection coefficient of the antenna at each frequency correspondingly increases. In this case, the reflection coefficient of the antenna increases in the uplink frequency band, and the SAR is reduced. In addition, if the downlink frequency band of the antenna is 1.805 GHZ-1.880 GHZ, after the inductance of the antenna is adjusted, a corresponding reflection coefficient of the antenna at each frequency decreases. In this case, the reflection coefficient of the antenna decreases in the downlink frequency band of the antenna.

A person skilled in the art may understand that the reflection coefficient of the antenna decreases in the downlink frequency band of the antenna, so that the antenna has better reception performance. Therefore, by adjusting the inductance of the antenna, the SAR of the antenna is reduced and the reception performance of the antenna is further improved.

For example, reflection coefficients of the antenna in different human body-antenna distance scenarios may be detected by using the radio frequency circuit 500 shown in FIG. 5 before and after inductance adjustment. A detection result is shown in FIG. 15.

Figure 15:
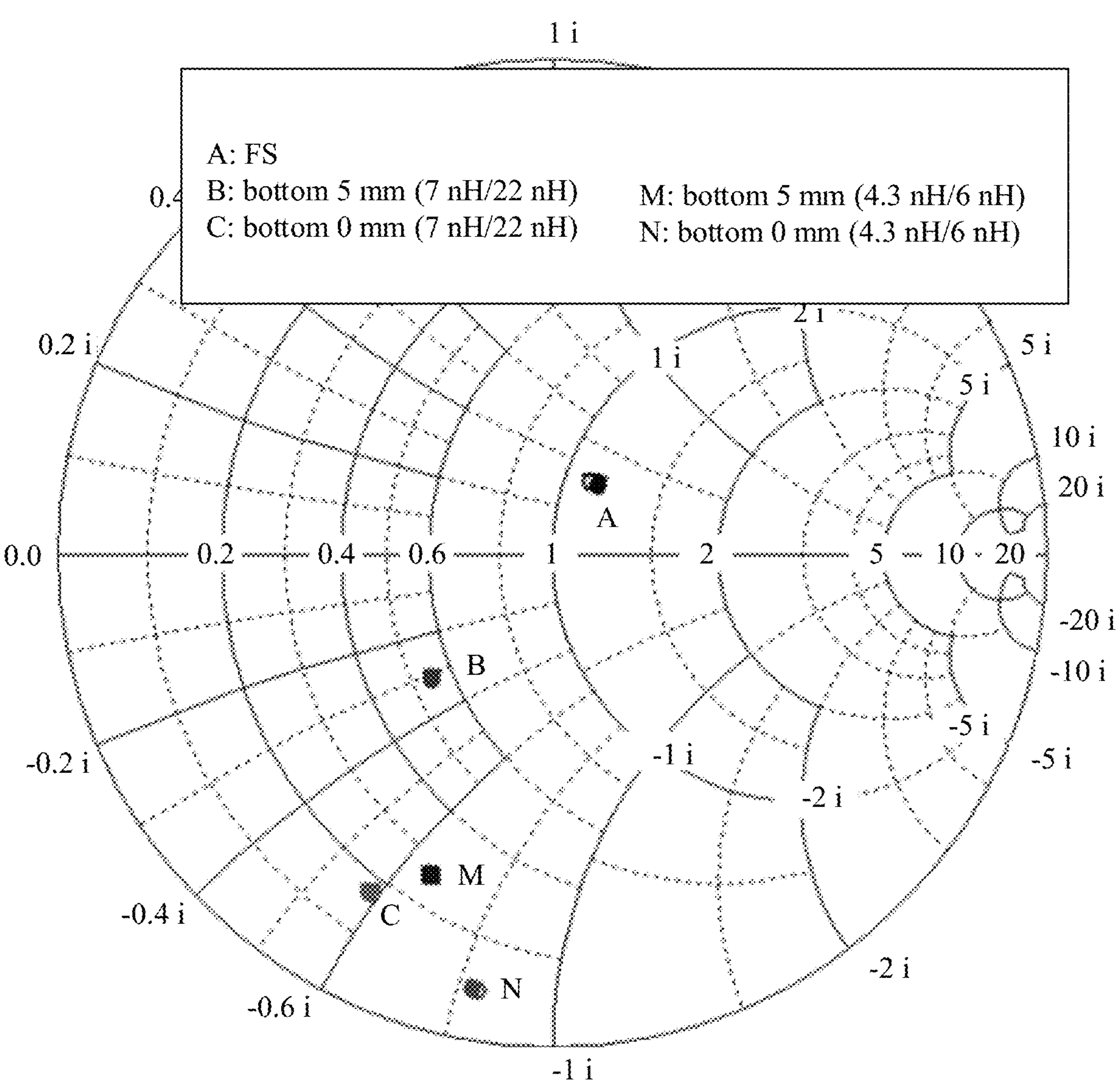
FIG. 15 is a schematic diagram of locations of reflection coefficients of an antenna on a Smith chart before and after inductor adjustment according to an embodiment of this application.

FIG. 15 is a schematic diagram of locations of reflection coefficients of an antenna on a Smith chart before and after inductor adjustment according to an embodiment of this application. As shown in FIG. 15, a point B is a location of the reflection coefficient of the antenna on the Smith chart when the inductor 1 in the antenna is 7 nH, the inductor 2 is 22 nH, and the human body is 5 mm away from the antenna; a point Mis a location of the reflection coefficient of the antenna on the Smith chart when the inductor 1 in the antenna is 4.3 nH, the inductor 2 is 6 nH, and the human body is 5 mm away from the antenna; a point C is a location of the reflection coefficient of the antenna on the Smith chart when the inductor 1 in the antenna is 7 nH, the inductor 2 is 22 nH, and the human body is 0 mm away from the antenna; and a point N is a location of the reflection coefficient of the antenna on the Smith chart when the inductor 1 in the antenna is 4.3 nH, the inductor 2 is 6 nH, and the human body is 0 mm away from the antenna. It can be seen from FIG. 15 that a distance between the point M and the center of the circle of the Smith chart is greater than a distance between the point B and the center of the circle of the Smith chart, and a distance between the point N and the center of the circle of the Smith chart is greater than a distance between the point C and the center of the circle of the Smith chart; and correspondingly, a distance between the point M and the circumference of the Smith chart is less than a distance between the point B and the circumference of the Smith chart, and a distance between the point N and the circumference of the Smith chart is less than a distance between the point C and the circumference of the Smith chart. It indicates that the reflection coefficient of the transmit frequency band of the antenna increases after the inductance of the antenna is adjusted.

SARs and conduction power differences of the antenna that are obtained before and after inductor adjustment at different resonance frequencies are shown in Table 2.

TABLE 2

The SARs and the conduction power differences of the antenna that are obtained before and after inductor adjustment

| | Initial SAR-initial state | | Adjusted SAR-shifted to reception | | Power difference | |
|---|---|---|---|---|---|---|
| Resonance frequency | Bottom 0 mm | Bottom 5 mm | Bottom 0 mm | Bottom 5 mm | Bottom 0 mm | Bottom 5 mm |
| 1.71 GHz | 2.83 | 1.79 | 1.45 | 1.01 | −2.9 | −2.5 |
| 1.75 GHz | 2.94 | 1.84 | 1.51 | 1.08 | −2.9 | −2.3 |
| 1.78 GHz | 3.03 | 1.87 | 1.56 | 1.15 | −2.8 | −2.1 |

It can be learned from Table 2 that the SAR of the antenna is reduced after the terminal device adjusts a series inductances of the antenna. In addition, the conduction power of the antenna is not affected.

It should be understood that FIG. 13 merely shows an example in which the terminal device increases the reflection coefficient of the antenna by adjusting the inductance. In a different case, the terminal device may adjust the inductance of the antenna based on the location of the real-time reflection coefficient of the antenna on the Smith chart and an internal circuit structure of the antenna. Therefore, in the different case, the terminal device may also increase the reflection coefficient of the transmit frequency band of the antenna by increasing the inductance of the antenna.

In still another possible implementation, the terminal device may increase the reflection coefficient of the transmit frequency band of the antenna by adjusting the capacitance and the inductance of the antenna. That is, the terminal device may adjust both the capacitor and the inductor of the antenna, to change the capacitance and the inductance. Details are not described in this embodiment of this application again.

For example, the terminal device may adjust the capacitance of the antenna from the first value to the second value, and adjust the inductance from the third value to the fourth value, to increase the reflection coefficient of the transmit frequency band of the antenna, and further reduce the SAR of the antenna, where the second value is less than the first value, and the fourth value is less than the third value.

It should be understood that, in the foregoing three possible implementations, quantities of capacitors and inductors of the antenna are merely examples, and larger or smaller quantities all fall within the protection scope of this application. In addition, the terminal device may adjust all capacitors and/or all inductors in the antenna, or may adjust some capacitors and/or some inductors. For example, in FIG. 13, the antenna may have three inductors or another quantity of inductors, and two inductors or another quantity of inductors are adjusted. In addition, the capacitances and the inductances in FIG. 10 and FIG. 13 are also examples. The capacitance and the inductance of the antenna each may be adjusted to another value. This is not limited in this embodiment of this application.

Figure 16:
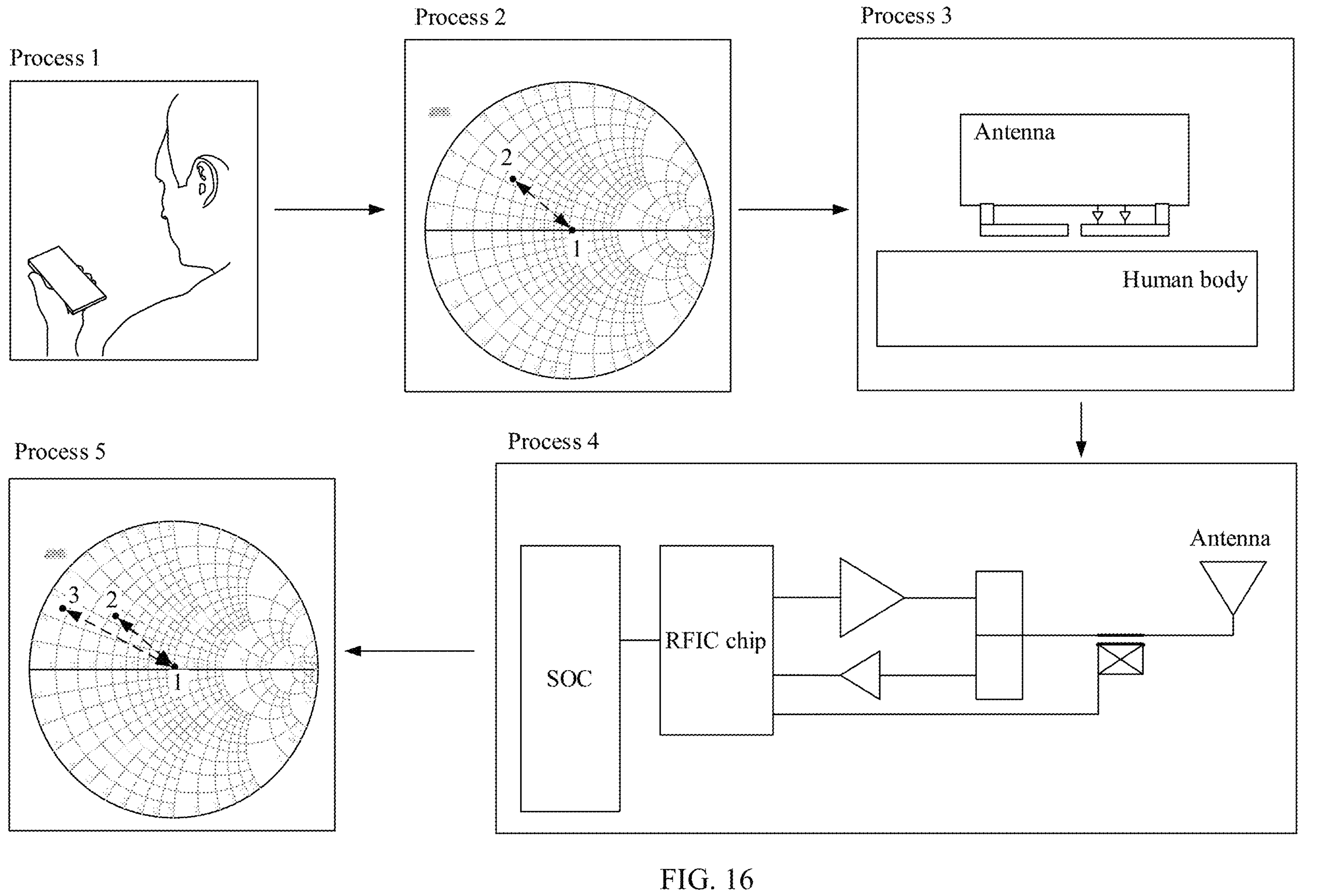
FIG. 16 is a schematic diagram of a process of a terminal antenna control method according to an embodiment of this application.

The following describes a specific implementation process of the terminal antenna control method with reference to FIG. 16.

FIG. 16 is a schematic diagram of a process of a terminal antenna control method according to an embodiment of this application. As shown in FIG. 16, the terminal antenna control method totally includes five processes: a process 1, a process 2, a process 3, a process 4, and a process 5.

The radio frequency circuit in the terminal device detects the real-time reflection coefficient of the antenna in the terminal device at a specific time period. In the process 1, the human body approaches and uses the terminal device. In the process 2, the radio frequency circuit in the terminal device detects the real-time reflection coefficient of the antenna, and determines, through data analysis, that the antenna is in the human body use scenario in this case. In the process 3, the SAR value of the antenna is detected, and the SAR of the antenna is 2 W/kg, which is greater than the first preset threshold 2 W/kg. Therefore, the SAR of the antenna needs to be further reduced. In the process 4, a logical status of the antenna is adjusted by using the radio frequency circuit of the antenna, so that the capacitance of the antenna is adjusted from 1.4 pF to 0.8 pF. In the process 5, it is found, by detecting the reflection coefficient of the antenna by the radio frequency circuit, that the location of the real-time reflection coefficient of the antenna on the Smith chart is moved from a point 2 to a point 3, that is, the distance between the first coordinate point and the second coordinate point increases after adjustment. In this case, the reflection coefficient of the transmit frequency band of the antenna increases, and a detected SAR is 1.01 W/kg, which is less than the first preset threshold 2 W/kg.

The foregoing describes in detail the terminal antenna control method in the embodiments of this application with reference to FIG. 2 to FIG. 16. The following describes in detail a terminal antenna control apparatus in the embodiments of this application with reference to FIG. 17 and FIG. 18.

Figure 17:
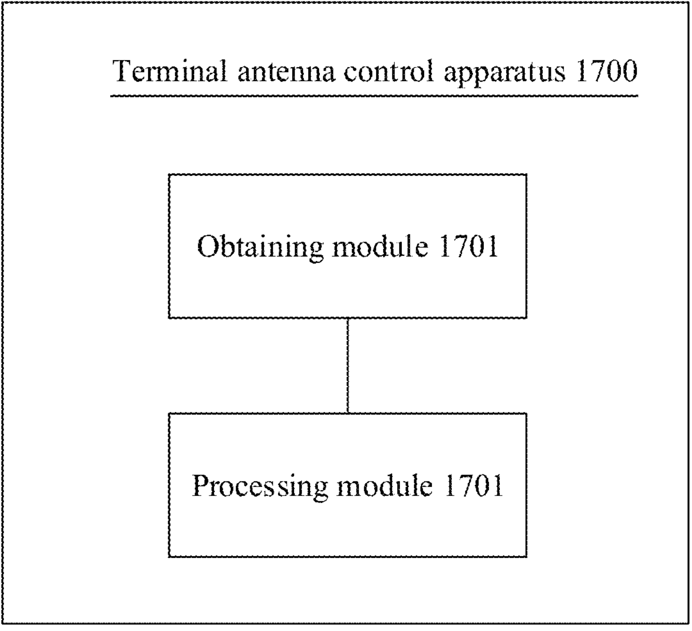
FIG. 17 is a schematic diagram of a structure of a terminal antenna control apparatus according to an embodiment of this application.

FIG. 17 is a schematic diagram of a structure of a terminal antenna control apparatus 1700 according to an embodiment of this application. The apparatus 1700 includes an obtaining module 1701 and a processing module 1702.

In a possible implementation, the apparatus 1700 is configured to implement the steps corresponding to the terminal device in the foregoing method 200.

The obtaining module 1701 is configured to obtain a real-time reflection coefficient of an antenna of a terminal device.

The processing module 1702 is configured to: determine, based on the real-time reflection coefficient, whether the antenna is in a human body use scenario; if the antenna is in the human body use scenario, determine whether a specific absorption rate SAR of the antenna is greater than or equal to a first preset threshold; and if the SAR is greater than or equal to the first preset threshold, adjust an adjustable device of the antenna to increase a reflection coefficient of a transmit frequency band of the antenna, where the adjustable device includes a capacitor and/or an inductor.

Optionally, the processing module 1702 is specifically configured to: calculate a distance difference between locations that are of the real-time reflection coefficient and a free space FS reflection coefficient of the antenna and that are on a Smith chart; and determine, based on the distance difference, whether the antenna is in the human body use scenario.

Optionally, the processing module 1702 is specifically configured to: determine a first coordinate point of the real-time reflection coefficient on the Smith chart; determine a second coordinate point of the FS reflection coefficient of the antenna on the Smith chart; and calculate a distance between the first coordinate point and the second coordinate point, and determine the distance as the distance difference between the locations that are of the real-time reflection coefficient and the FS reflection coefficient of the antenna and that are on the Smith chart.

Optionally, the processing module 1702 is specifically configured to: when a difference is greater than or equal to a second preset threshold, determine that the antenna is in the human body use scenario.

Optionally, the processing module 1702 is further configured to: if the antenna is not in the human body use scenario, determine that the antenna is in an FS state, and maintain a current state of the antenna.

Optionally, the processing module 1702 is further configured to: if the SAR is less than the first preset threshold, maintain a current state of the antenna.

It should be understood that the apparatus 1700 herein is embodied in a form of a functional module. The term "module" herein may be an application specific integrated circuit (application specific integrated circuit, ASIC), an electronic circuit, a processor (for example, a shared processor, a dedicated processor, or a processor group) configured to execute one or more software or firmware programs, a memory, a combinational logic circuit, and/or another suitable component supporting the described function. In an optional example, a person skilled in the art may understand that the apparatus 1700 may be specifically the terminal device in the foregoing embodiments, and the apparatus 1700 may be configured to perform the procedures and/or the steps corresponding to the terminal device in the foregoing method embodiments. To avoid repetition, details are not described herein again.

The apparatus 1700 has functions of implementing corresponding steps performed by the SOC in the foregoing method. The functions may be implemented by hardware, or may be implemented by hardware executing corresponding software. The hardware or software includes one or more modules corresponding to the functions. For example, the processing module 1702 may include a determining module and an adjustment module. The determining module may be configured to implement the steps and/or the procedures that correspond to the processing module and that are used to perform a determining action. The adjustment module may be configured to implement the steps and/or the procedures that correspond to the processing module and that are used to perform an adjustment action. The determining module and the adjustment module may be replaced by the SOC to separately perform related processing operations in the method embodiments.

In this embodiment of this application, the apparatus 1700 in FIG. 17 may alternatively be a chip or a chip system, for example, an SOC. Correspondingly, the processing module 1702 may be a transceiver circuit of the chip. This is not limited herein.

Figure 18:
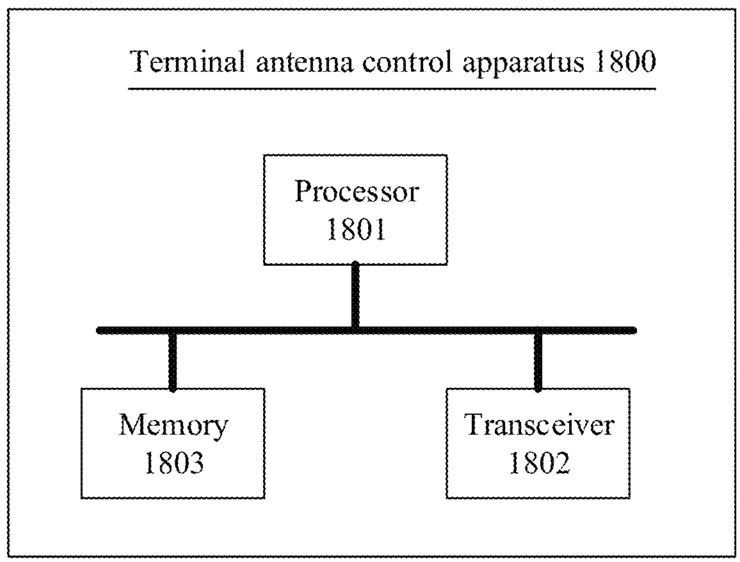
FIG. 18 is a schematic diagram of a structure of another terminal antenna control apparatus according to an embodiment of this application.

FIG. 18 is a schematic diagram of a structure of another terminal antenna control apparatus 1800 according to an embodiment of this application. The apparatus 1800 includes a processor 1801, a transceiver 1802, and a memory 1803. The processor 1801, the transceiver 1802, and the memory 1803 communicate with each other through an internal connection channel. The memory 1803 is configured to store instructions. The processor 1801 is configured to execute the instructions stored in the memory 1803, to control the transceiver 1802 to send a signal and/or receive a signal.

It should be understood that the apparatus 1800 may be specifically the terminal device in the foregoing embodiments, and may be configured to perform the steps and/or the procedures corresponding to the terminal device in the foregoing method embodiments. Optionally, the memory 1803 may include a read-only memory and a random access memory, and provides instructions and data to the processor. A part of the memory may further include a non-volatile random access memory. For example, the memory may further store information about a device type. The processor 1801 may be configured to execute the instructions stored in the memory, and when the processor 1801 executes the instructions stored in the memory, the processor 1801 is configured to perform the steps and/or the procedures in the foregoing method embodiments. The transceiver 1802 may include a transmitter and a receiver, the transmitter may be configured to implement the steps and/or the procedures that correspond to the transceiver and that are used to perform a sending action, and the receiver may be configured to implement the steps and/or the procedures that correspond to the transceiver and that are used to perform a reception action.

It should be understood that in this embodiment of this application, the processor may be a central processing unit (central processing unit, CPU), and the processor may alternatively be another general-purpose processor, a digital signal processor (DSP), an application specific integrated circuit (ASIC), a field programmable gate array (FPGA), another programmable logic device, a discrete gate, a transistor logic device, a discrete hardware component, or the like. The general-purpose processor may be a microprocessor, or the processor may be any conventional processor or the like.

In an implementation process, the steps of the foregoing method may be completed by a hardware-integrated logic circuit in the processor or instructions in a form of software. The steps of the method disclosed in the embodiments of this application may be directly performed by a hardware processor, or by a combination of hardware in the processor and a software module. The software module may be located in a storage medium that is mature in the art, for example, a random access memory, a flash memory, a read-only memory, a programmable read-only memory, an electrically erasable programmable memory, or a register. The storage medium is located in the memory. The processor executes the instructions in the memory, and completes the steps of the foregoing method together with hardware in the processor. To avoid repetition, details are not described herein again.

This application further provides a computer-readable storage medium. The computer-readable storage medium is configured to store a computer program, and the computer program is used to implement the method in the foregoing method embodiments.

This application further provides a computer program product. The computer program product includes a computer program (which may also be referred to as code or instructions), and when the computer program runs on a computer, the computer can perform the method in the foregoing method embodiments.

A person of ordinary skill in the art may realize that the example modules and algorithm steps described with reference to the embodiments disclosed in this specification can be implemented by using electronic hardware or a combination of computer software and electronic hardware. Whether these functions are performed in a hardware or software manner depends on particular applications and design constraints of the technical solutions. A skilled person may use different methods to implement the described functions for each specific application, but it should not be considered that such an implementation goes beyond the scope of this application.

A person skilled in the art may clearly understand that for ease and brevity of description, for a specific operation process of the system, apparatus, and module described above, refer to a corresponding process in the foregoing method embodiments. Details are not described herein again.

In several embodiments provided in this application, it should be understood that the disclosed system, apparatus, and method may be implemented in another manner. For example, the foregoing apparatus embodiment is merely an example. For example, division into the modules is merely logical function division. In an actual implementation, there may be another division manner. For example, a plurality of modules or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or modules may be implemented in an electrical form, a mechanical from, or another form.

The modules described as separate parts may or may not be physically separated, and parts displayed as modules may or may not be physical modules, that is, may be located at one position, or may be distributed on a plurality of network modules. Some or all of the modules may be selected based on an actual requirement, to achieve the objectives of the solutions in the embodiments.

In addition, the functional modules in the embodiments of this application may be integrated into one processing module, or each module may exist alone physically, or two or more modules may be integrated into one module.

When the functions are implemented in a form of a software functional module and sold or used as an independent product, the functions may be stored in a computer-readable storage medium. Based on such an understanding, the technical solutions of this application essentially, or the part contributing to the conventional technology, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, and are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A terminal antenna control method, comprising:

obtaining a real-time reflection coefficient of an antenna of a terminal device;

determining, based on the real-time reflection coefficient, whether the antenna is in a human body use scenario;

if the antenna is in the human body use scenario, determining whether a specific absorption rate (SAR) of the antenna is greater than or equal to a first preset threshold; and if the SAR is greater than or equal to the first preset threshold, adjusting an adjustable device of the antenna to increase a reflection coefficient of a transmit frequency band of the antenna, wherein the adjustable device comprises a capacitor and/or an inductor.

2. The method according to claim 1, wherein the determining, based on the real-time reflection coefficient, whether the antenna is in a human body use scenario comprises:

calculating a distance difference between locations that are of the real-time reflection coefficient and a free space FS reflection coefficient of the antenna and that are on a Smith chart; and determining, based on the distance difference, whether the antenna is in the human body use scenario.

3. The method according to claim 2, wherein the calculating a distance difference between locations that are of the real-time reflection coefficient and a free space FS reflection coefficient of the antenna and that are on a Smith chart comprises:

determining a first coordinate point of the real-time reflection coefficient on the Smith chart;

determining a second coordinate point of the FS reflection coefficient of the antenna on the Smith chart; and calculating a distance between the first coordinate point and the second coordinate point, and determining the distance as the distance difference.

4. The method according to claim 2, wherein the determining, based on the distance difference, whether the antenna is in the human body use scenario comprises:

when the distance difference is greater than or equal to a second preset threshold, determining that the antenna is in the human body use scenario.

5. The method according to claim 1, wherein the method further comprises:

if the antenna is not in the human body use scenario, determining that the antenna is in an FS state, and maintaining a current state of the antenna.

6. The method according to claim 1, wherein the method further comprises:

if the SAR is less than the first preset threshold, maintaining a current state of the antenna.

7. A terminal antenna control apparatus, comprising:

an obtaining module, configured to obtain a real-time reflection coefficient of an antenna of a terminal device; and a processing module, configured to: determine, based on the real-time reflection coefficient, whether the antenna is in a human body use scenario; if the antenna is in the human body use scenario, determine whether a specific absorption rate (SAR) of the antenna is greater than or equal to a first preset threshold; and if the SAR is greater than or equal to the first preset threshold, adjust an adjustable device of the antenna to increase a reflection coefficient of a transmit frequency band of the antenna, wherein the adjustable device comprises a capacitor and/or an inductor.

8. The apparatus according to claim 7, wherein the processing module is specifically configured to:

calculate a distance difference between locations that are of the real-time reflection coefficient and a free space FS reflection coefficient of the antenna and that are on a Smith chart; and determine, based on the distance difference, whether the antenna is in the human body use scenario.

9. The apparatus according to claim 8, wherein the processing module is specifically configured to:

determine a first coordinate point of the real-time reflection coefficient on the Smith chart;

determine a second coordinate point of the FS reflection coefficient of the antenna on the Smith chart; and calculate a distance between the first coordinate point and the second coordinate point, and determine the distance as the distance difference.

10. The apparatus according to claim 8, wherein the processing module is specifically configured to:

when the distance difference is greater than or equal to a second preset threshold, determine that the antenna is in the human body use scenario.

11. The apparatus according to claim 7, wherein the processing module is further configured to:

if the antenna is not in the human body use scenario, determine that the antenna is in an FS state, and maintain a current state of the antenna.

12. The apparatus according to claim 7, wherein the processing module is further configured to:

if the SAR is less than the first preset threshold, maintain a current state of the antenna.

13. A terminal antenna control method, comprising:

obtaining a real-time reflection coefficient of an antenna of a terminal device;

determining, based on the real-time reflection coefficient, whether the antenna is in a human body use scenario;

if the antenna is in the human body use scenario, determining whether a specific absorption rate (SAR) of the antenna is greater than or equal to a first preset threshold; and if the SAR is less than the first preset threshold, maintaining a current state of the antenna; or if the SAR is greater than or equal to the first preset threshold, adjusting an adjustable device of the antenna to increase a reflection coefficient of a transmit frequency band of the antenna, wherein the adjustable device comprises a capacitor and/or an inductor.

14. The method according to claim 13, wherein the determining, based on the real-time reflection coefficient, whether the antenna is in a human body use scenario comprises:

calculating a distance difference between locations that are of the real-time reflection coefficient and a free space FS reflection coefficient of the antenna and that are on a Smith chart; and determining, based on the distance difference, whether the antenna is in the human body use scenario.

15. The method according to claim 14, wherein the calculating a distance difference between locations that are of the real-time reflection coefficient and a free space FS reflection coefficient of the antenna and that are on a Smith chart comprises:

determining a first coordinate point of the real-time reflection coefficient on the Smith chart;

determining a second coordinate point of the FS reflection coefficient of the antenna on the Smith chart; and calculating a distance between the first coordinate point and the second coordinate point, and determining the distance as the distance difference.

16. The method according to claim 15, wherein the determining, based on the distance difference, whether the antenna is in the human body use scenario comprises:

when the distance difference is greater than or equal to a second preset threshold, determining that the antenna is in the human body use scenario.

17. The method according to claim 15, wherein the method further comprises:

if the antenna is not in the human body use scenario, determining that the antenna is in an FS state, and maintaining a current state of the antenna.

18. The method according to claim 14, wherein the determining, based on the distance difference, whether the antenna is in the human body use scenario comprises:

when the distance difference is greater than or equal to a second preset threshold, determining that the antenna is in the human body use scenario.

19. The method according to claim 14, wherein the method further comprises:

if the antenna is not in the human body use scenario, determining that the antenna is in an FS state, and maintaining a current state of the antenna.

20. The method according to claim 13, wherein the method further comprises:

if the antenna is not in the human body use scenario, determining that the antenna is in an FS state, and maintaining a current state of the antenna.

* * * * *